(12) United States Patent
Lee et al.

(10) Patent No.: US 9,739,920 B2
(45) Date of Patent: Aug. 22, 2017

(54) POLARIZING TOUCH SCREEN PANEL AND DISPLAY APPARATUS COMPRISING THE SAME

(71) Applicant: SAMSUNG ELECTRONICS CO., LTD., Suwon-si, Gyeonggi-do (KR)

(72) Inventors: Joo Won Lee, Suwon-si (KR); Young Mo Kang, Seoul (KR); Jun Ho Sung, Seoul (KR); Dong Jun Lee, Suwon-si (KR); Il Yong Jung, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 21 days.

(21) Appl. No.: 14/995,539

(22) Filed: Jan. 14, 2016

(65) Prior Publication Data

US 2016/0231844 A1    Aug. 11, 2016

(30) Foreign Application Priority Data

Feb. 11, 2015 (KR) ........................ 10-2015-0021136

(51) Int. Cl.
| | |
|---|---|
| *G06F 3/041* | (2006.01) |
| *G02B 5/30* | (2006.01) |
| *G02F 1/1333* | (2006.01) |
| *G06F 3/044* | (2006.01) |
| *G02F 1/1335* | (2006.01) |

(52) U.S. Cl.
CPC ....... *G02B 5/3058* (2013.01); *G02F 1/13338* (2013.01); *G06F 3/044* (2013.01); *G02F 1/133512* (2013.01); *G02F 2001/133548* (2013.01); *G06F 2203/04103* (2013.01); *G06F 2203/04112* (2013.01)

(58) Field of Classification Search
CPC ......... G06F 3/041; G02B 5/30; G02F 1/1333; G02F 1/1335; G02F 1/13
See application file for complete search history.

(56) References Cited

U.S. PATENT DOCUMENTS

| | | | |
|---|---|---|---|
| 6,624,870 B1 * | 9/2003 | Greene | ............... G02F 1/13336 349/153 |
| 2008/0299467 A1 * | 12/2008 | Kim | ....................... B82Y 10/00 430/5 |

(Continued)

FOREIGN PATENT DOCUMENTS

| | | |
|---|---|---|
| JP | 2008197757 | 8/2008 |
| KR | 10-20100043938 | 4/2010 |

(Continued)

*Primary Examiner* — Pegeman Karimi
(74) *Attorney, Agent, or Firm* — Nixon & Vanderhye, P.C.

(57) ABSTRACT

Disclosed is a display panel including: a liquid crystal layer; and a polarization-touch sensing layer stacked on one side of the liquid crystal layer, the polarization-touch sensing layer comprising: a plurality of wire grid areas configured to polarize incident light from a light source the wire grid areas including grid patterns configured to transmit a plurality of touch sensing signals; and a plurality of seam areas arranged in between the plurality of wire grid areas and including a conductive area configured to transmit the touch sensing signal between a pair of adjacent grid patterns, and a nonconductive area configured to block the plurality of touch sensing signals from being transmitted between the pair of grid patterns.

20 Claims, 17 Drawing Sheets

(56) References Cited

U.S. PATENT DOCUMENTS

| | | | |
|---|---|---|---|
| 2012/0127405 A1* | 5/2012 | Lee | G02F 1/13336 349/106 |
| 2014/0093692 A1* | 4/2014 | Miyazawa | B29D 11/00336 428/156 |
| 2016/0033818 A1* | 2/2016 | Lee | G02F 1/133528 349/96 |

FOREIGN PATENT DOCUMENTS

| KR | 10-20110092768 | 8/2011 |
|---|---|---|
| KR | 10-20120047640 | 5/2012 |

* cited by examiner

POLARIZING TOUCH SCREEN PANEL AND DISPLAY APPARATUS COMPRISING THE SAME

CROSS-REFERENCE TO RELATED APPLICATION

This application is based on and claims priority under 35 U.S.C. §119 to Korean Patent Application No. 10-2015-0021136, filed on Feb. 11, 2015 in the Korean Intellectual Property Office, the disclosure of which is incorporated by reference herein in its entirety.

BACKGROUND

Field

Apparatuses and methods of the disclosure relate generally to a display panel and a display apparatus, and for example, to a display panel and a display apparatus, in which a wire grid polarizer is used for a touch screen.

Description of Related Art

A liquid crystal display panel transmits light emitted from a light source such as a backlight unit so that a user can view an image. The light emitted from the light source is considerably lost while passing through optical elements of the backlight unit, and a polarizer of the display panel also absorbs quite a bit of the light traveling toward the panel, thereby resulting in a heavy optical loss. Accordingly, a display structure having the heavy optical loss has to be improved in an optical efficiency to increase brightness.

If a wire grid polarizer is used instead of a film type polarizer for the display panel, only transmitted and reflected light without diffracted waves are provided since a period of a wire grid is shorter than half a wavelength of light, and thus the wire grid polarizer has a greater optical efficiency than the film type polarizer. However, the wire grid polarizer manufactured at a time is limited to a certain size, and it is therefore difficult to form a large-sized wire grid polarizer.

If a touch screen panel for sensing a user's touch input is provided separately from the polarizer in the display panel, problems arise in that manufacturing costs increase, a structure becomes complicated, and the touch screen panel, which is expensive, has to be replaced when it has a defect.

SUMMARY

An aspect of one or more example embodiments may provide a display panel and a display apparatus, in which a large-sized wire grid polarizer is used for a touch screen.

Another example may provide a display panel and a display apparatus, in which a large-sized wire grid polarizer is manufactured with a minimum and/or reduced invisible seam.

In accordance with an example, a display panel is provided, including: a liquid crystal layer; and a polarization-touch sensing layer stacked on one side of the liquid crystal layer, the polarization-touch sensing layer including: a plurality of wire grid areas configured to polarize incident light from a light source, the wire grid areas including grid patterns configured to transmit a plurality of touch sensing signals; and a plurality of seam areas provided in between the plurality of wire grid areas, the seam areas including a conductive area configured to transmit the touch sensing signal between a pair of adjacent grid patterns among the plurality of grid patterns, and a nonconductive area configured to block the plurality of touch sensing signals from being transmitted between the pair of grid patterns.

According to an example embodiment, a large-sized wire grid polarizer formed by a plurality of wire grid polarizers may be used to realize the touch-screen panel, thereby reducing costs and simplifying the structure while manufacturing a large-sized display apparatus with a touch screen function. For example, the conductive area for the touch sensing signal and the nonconductive area are provided in the seam area between the plurality of wire grid polarizers, thereby overcoming a problem of electrification or non-electrification due to the seam area between the plurality of touch sensing signals.

Each of the plurality of grid patterns may include a plurality of grid sub-groups configured to transmit the plurality of touch sensing signals. Thus, some adjacent grids in the plurality of the grid patterns may be grouped and assigned for the plurality of touch sensing signals.

The conductive area may be provided to correspond to each of the plurality of grid sub-groups. For example, the conductive areas may be arranged to respectively correspond to the plurality of grid sub-groups, so that the touch sensing signal can be more effectively transmitted between a pair of grid sub-groups having the conductive area therebetween.

The conductive area may include the same material as the plurality of grid patterns. Thus, the conductive area may have the same electric conductivity as the grid pattern, so that the touch sensing signal can be more effectively transmitted between the pair of grid sub-groups having the conductive area therebetween.

The plurality of grid patterns may be formed on the plurality of wire grid areas by etching a metal layer of the polarization-touch sensing layer except the conductive area. Thus, the grid pattern in the wire grid area except the conductive area is etched, thereby more effectively forming the grid sub-group of the grid pattern and the corresponding conductive area. Further, it is more effective to form the grid sub-group and the corresponding conductive area which are made of the same conductive material.

The nonconductive area may be formed having a predetermined size to prevent or block the touch sensing signal from being transmitted between the pair of adjacent grid patterns with the nonconductive area therebetween. Thus, the nonconductive area may be formed to be larger than a predetermined size, thereby more effectively forming a conductive structure between the grid sub-group and the conductive area.

The plurality of grid patterns may be separated from each other with the nonconductive area therebetween. Thus, the seam area provided between the adjacent grid patterns and having electric conductivity may be removed by etching, thereby preventing or blocking the touch sensing signal from being transmitted between the adjacent grid patterns by the nonconductive area.

The nonconductive area may be formed on the plurality of seam area by etching a metal layer of the polarization-touch sensing layer except the conductive area. Thus, the metal layer is etched except the conductive area for allowing an electric current to flow in the seam area, thereby more effectively forming the grid sub-group of the grid patterns and the corresponding conductive area.

The display panel may further include a black matrix arranged to overlap at least a part of the seam area so that the seam area cannot be seen from a viewing direction of the display panel. Thus, when a large-sized wire grid polarizer is realized using the plurality of wire grid polarizers, the black matrix layer is arranged to overlap the seam area between the adjacent wire grid polarizers, so that the seam area cannot be seen from the viewing direction, thereby improving quality of an image to be displayed.

The polarization-touch sensing layer may further include a connection area corresponding to each of the plurality of grid sub-groups and where some grids of the grid sub-groups are connected to electrodes for outputting the touch sensing signal. The other grids of the grid sub-group are provided not to transmit the touch sensing signal, and therefore touch sensitivity is improved as compared with that of a case where all the grids in the grid sub-group are used in transmitting the touch sensing signal.

In the connection area, the number of grids which are not connected to the electrodes, may be determined to prevent and/or reduce interference of the touch sensing signal between adjacent grids of the grid sub-group. Thus, it is possible to determine an optimum number of grids for transmitting a touch sensing signal within the grid sub-group.

The display panel may further include a second polarization-touch sensing layer arranged opposite the polarization-touch sensing layer, the second polarization-touch sensing layer including: a plurality of second wire grid areas configured to polarize incident light from a light source, the second wire grid areas having grid patterns configured to transmit a plurality of touch sensing signals; and a plurality of second seam areas configured to be provided in between the plurality of second wire grid areas, the second seam areas including a conductive area configured to transmit the touch sensing signal between a pair of adjacent second grid patterns among the plurality of second grid patterns, and a nonconductive area configured to prevent or block the plurality of touch sensing signals from being transmitted between the pair of second grid patterns. Thus, two large-sized wire grid polarizers may be used to make the display panel, the polarizers not only having a polarizing function but also a touch sensing function.

The second grid pattern of the second polarization-touch sensing layer may be arranged perpendicularly intersecting the grid pattern of the polarization-touch sensing layer. Thus, the grids formed in the two large-sized wire grid polarizers are arranged perpendicularly intersecting with each other, thereby having a function of transmitting and receiving an electric current for sensing a touch.

In accordance with an example, provided a display apparatus is provided including: signal receiving circuitry configured to receive an image signal; a signal processor configured to process the received image signal; a display panel configured to display an image based on the processed image signal; and a controller configured to control the display apparatus to display the image, the display panel including: a liquid crystal layer; and a polarization-touch sensing layer configured to be stacked on one side of the liquid crystal layer, the polarization-touch sensing layer including: a plurality of wire grid areas configured to polarize incident light from a light source, the wire grid areas including grid patterns configured to transmit a plurality of touch sensing signals; and a plurality of seam areas configured to be provided in between the plurality of wire grid areas the seam areas including a conductive area configured to transmit the touch sensing signal between a pair of adjacent grid patterns, and a nonconductive area configured to prevent or block the plurality of touch sensing signals from being transmitted between the pair of grid patterns.

According to an example embodiment, the large-sized wire grid polarizer formed by the plurality of wire grid polarizers may be used to realize the touch-screen panel, thereby reducing costs and simplifying the structure while manufacturing a large-sized display apparatus with a touch screen function. For example, the conductive area for the touch sensing signal and the nonconductive area are provided in the seam area between the plurality of wire grid polarizers, thereby overcoming a problem of electrification or non-electrification due to the seam area between the plurality of touch sensing signals.

Each of the plurality of grid patterns may include a plurality of grid sub-groups configured to transmit the plurality of touch sensing signals. Thus, some adjacent grids in the plurality of the grid patterns may be grouped and assigned for the plurality of touch sensing signals.

The conductive area may be provided to correspond to each of the plurality of grid sub-groups. For example, the conductive areas may be arranged to correspond to the plurality of grid sub-groups, so that the touch sensing signal can be more effectively transmitted between a pair of grid sub-groups having the conductive area therebetween.

The conductive area may be made of the same material as the plurality of grid patterns. Thus, the conductive area may have the same electric conductivity as the grid pattern, so that the touch sensing signal can be more effectively transmitted between the pair of grid sub-groups having the conductive area therebetween.

The plurality of grid patterns may be formed on the plurality of wire grid areas by etching a metal layer of the polarization-touch sensing layer except the conductive area. Thus, the grid pattern in the wire grid area except the conductive area is etched, thereby more effectively forming the grid sub-group of the grid pattern and the corresponding conductive area. Further, it is more effective to form the grid sub-group and the corresponding conductive area which are made of the same conductive material.

The nonconductive area may be formed having a predetermined size to prevent or block the touch sensing signal from being transmitted between the pair of adjacent grid patterns having the nonconductive area therebetween. Thus, the nonconductive area may be formed to be larger than a predetermined size, thereby more effectively forming a conductive structure between the grid sub-group and the conductive area.

The plurality of grid patterns may be separated from each other with the nonconductive area therebetween. Thus, the seam area provided between the adjacent grid patterns and having electric conductivity is removed by etching, thereby preventing or blocking the touch sensing signal from being transmitted between the adjacent grid patterns.

The nonconductive area may be formed on the plurality of seam areas by etching a metal layer of the polarization-touch sensing layer except the conductive area. Thus, the metal layer is etched except the conductive area for allowing an electric current to flow in the seam area, thereby more effectively forming the grid sub-group of the grid patterns and the corresponding conductive area.

The display apparatus may further include a black matrix arranged to overlap at least a part of the seam area so that the seam area cannot be seen from a viewing direction of the display panel. Thus, when a large-sized wire grid polarizer is realized using the plurality of wire grid polarizers, the black matrix layer is arranged to overlap the seam area between the adjacent wire grid polarizers, so that the seam area cannot be seen from the viewing direction, thereby improving quality of an image to be displayed.

The polarization-touch sensing layer may further include a connection area corresponding to each of the plurality of grid sub-groups where some grids of the grid sub-groups are connected to electrodes for outputting the touch sensing signal. The other grids of the grid sub-group are provided not to transmit the touch sensing signal, and therefore touch sensitivity is improved as compared with that of a case where all the grids in the grid sub-group are used in transmitting the touch sensing signal.

In the connection area, the number of grids, which are not connected to the electrodes, may be determined to prevent and/or reduce interference of the touch sensing signal between adjacent grids of the grid sub-group. Thus, it is possible to determine an optimum number of grids for transmitting a touch sensing signal within the grid subgroup.

The display apparatus may further include a second polarization-touch sensing layer arranged opposite the polarization-touch sensing layer, the second polarization-touch sensing layer including: a plurality of second wire grid areas configured to polarize incident light from a light source the second wire grid areas having grid patterns configured to transmit a plurality of touch sensing signals; and a plurality of second seam areas configured to be provided in between the plurality of second wire grid areas, the second seam areas including a conductive area configured to transmit the touch sensing signal between a pair of adjacent second grid patterns among the plurality of second grid patterns, and a nonconductive area configured to prevent or block the plurality of touch sensing signals from being transmitted between the pair of second grid patterns. Thus, two large-sized wire grid polarizers may be used to make the display panel, the polarizers having not only a polarizing function but also a touch sensing function.

The second grid pattern of the second polarization-touch sensing layer may be arranged perpendicularly intersecting the grid pattern of the polarization-touch sensing layer. Thus, the grids formed in the two large-sized wire grid polarizers are arranged perpendicularly intersecting with each other, thereby having a function of transmitting and receiving an electric current for sensing a touch.

BRIEF DESCRIPTION OF THE DRAWINGS

The above and/or other aspects will become apparent and more readily appreciated from the following detailed description, taken in conjunction with the accompanying drawings, in which like reference numerals refer to like elements, and wherein.

DETAILED DESCRIPTION

Figure 1:
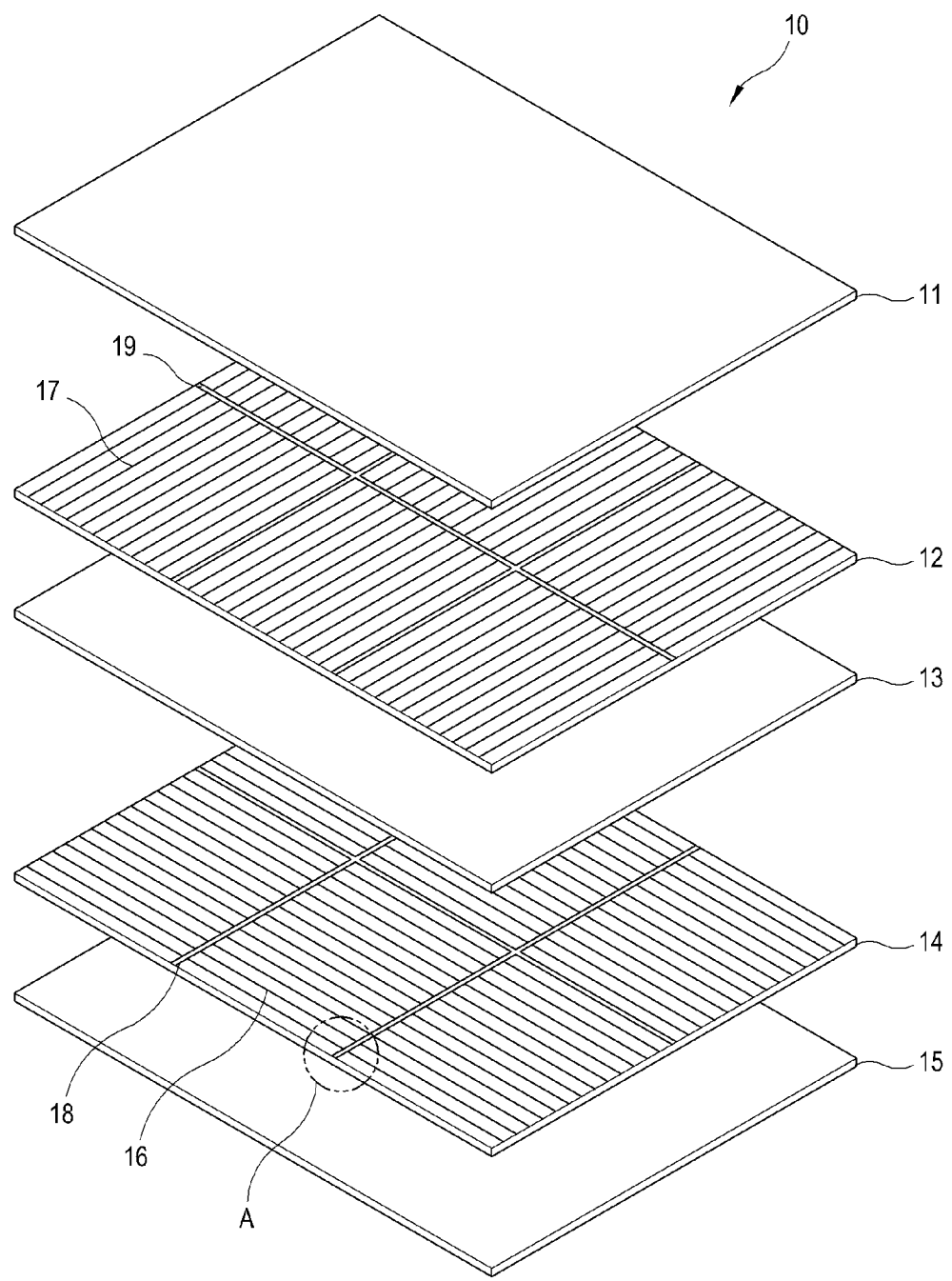
FIG. 1 is an exploded perspective view illustrating an example display panel.

Example embodiments will be described in greater detail with reference to accompanying drawings so as to be readily understood by a person having an ordinary skill in the art. The disclosure may be achieved in various forms and should not be construed as being limited to the following example embodiments. For clarity, parts not directly related to the disclosure may be omitted, and like reference numerals refer to like elements throughout.

Features of elements included in a display panel according to an example embodiment will be first described in greater detail with reference to FIG. 1, and FIGS. 2 to 16 may also be referred to, as necessary.

FIG. 1 is an exploded perspective view illustrating an example display panel. As illustrated in FIG. 1, a display panel 10 may include, for example, a first glass substrate 11 and a second glass substrate 15, which are arranged facing each other; a liquid crystal layer 13 interposed in between the first glass substrate 11 and the second glass substrate 15; a polarization-touch sensing layer 12, and a second polarization-touch sensing layer 14. The display panel 10 may further include, for example, a black matrix and a pixel layer, which are interposed in between the first glass substrate 11 and the second glass substrate 15. The elements included in the display panel 11 are not limited to the foregoing description, and may further include other additional elements. The display panel 10 may for example be applicable to a television, a monitor and the like home appliances; a smart phone, a portable multimedia player (PMP), a Netbook, a notebook computer, or the like portable terminal; display apparatuses for an electronic board and advertisement; etc.

Each of the first glass substrate 11 and the second glass substrate 15 may be made of a transparent material that transmits light emitted from a backlight unit (not shown).

Between the first glass substrate 11 and the second glass substrate 15, the liquid crystal layer 13, the orientation of which is varied depending on voltages applied in accordance with pixels, is interposed. The liquid crystal layer 13 may include liquid crystal modes such as a vertical alignment (VA) mode, a multi-domain vertical alignment (MVA), a patterned vertical alignment (PVA) mode, a twisted nematic (TN) mode, and an in-plane switching (IPS) mode, etc. To get a wider view angle, the liquid crystal layer 13 may be achieved by dividing or patterning a sub-pixel, uniformly adjusting a refractive index of liquid crystal, etc.

The polarization-touch sensing layer 12 and the second polarization-touch sensing layer 14 are stacked on either side of the liquid crystal layer 13, and may be manufactured by forming a grid pattern in accordance with a manufacturing process of the wire grid polarizer. The manufacturing processes of the polarization-touch sensing layer 12 and the second polarization-touch sensing layer 14 will be described with reference to FIG. 8 and FIG. 9.

Figure 8:
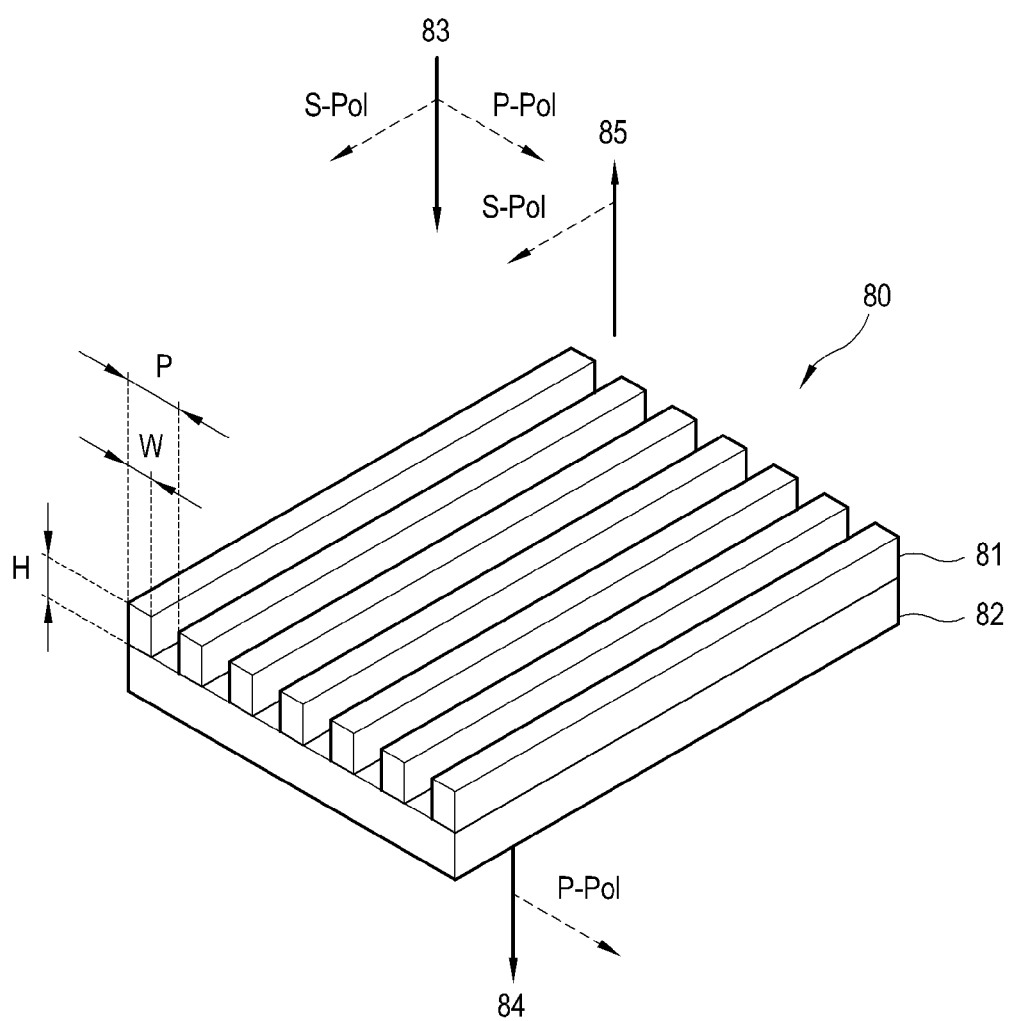
FIG. 8 is a perspective view illustrating an example wire grid polarizer.

FIG. 8 is a perspective view illustrating an example wire grid polarizer. As illustrated in FIG. 8, the manufacturing process of the wire grid polarizer 80 includes a process of depositing a metal layer on a glass substrate 82, and a process of patterning a grid on the metal layer by, for example, nano-imprint lithography, or the like. The metal layer may, for example be include aluminum (Al), silver (Ag), copper (Cu) or the like metal, or may contain molybdenum-tungsten (MoW), or the like high stiffness alloy. The metal layer may, for example, be made of conductive polymer or may contain a conductive polymer. The wire grid polarizer 80 includes grids 81, each of which has a predetermined height (H) and a predetermined width (W) and which are periodically arranged in parallel. If a period, i.e., a pitch p of the grids 81, which are included in the wire grid polarizer 80, is adjusted to be equal to or shorter than half a wavelength of incident light 83, only transmitted light 84 and reflected light 85 are generated without diffracted waves. The wire grid polarizer 80 transmits a polarized component P-Pol, which oscillates in a direction perpendicular to the grids 81, of the incident light 83 emitted from a backlight unit (not shown), but reflects and reuses a polarized component S-Pol, which oscillates in a direction parallel to the grids 81. Thus, the wire grid polarizer 80 decreases an optical loss and increases and/or maximizes an optical efficiency to thereby advantageously improve brightness. However, the maximum size of the grid 81 in the wire grid polarizer 80 is limited to about 12 inches ("), and therefore the process of manufacturing the wire grid polarizer has to be performed repetitively in order to manufacture a large-sized display panel.

Figure 9:
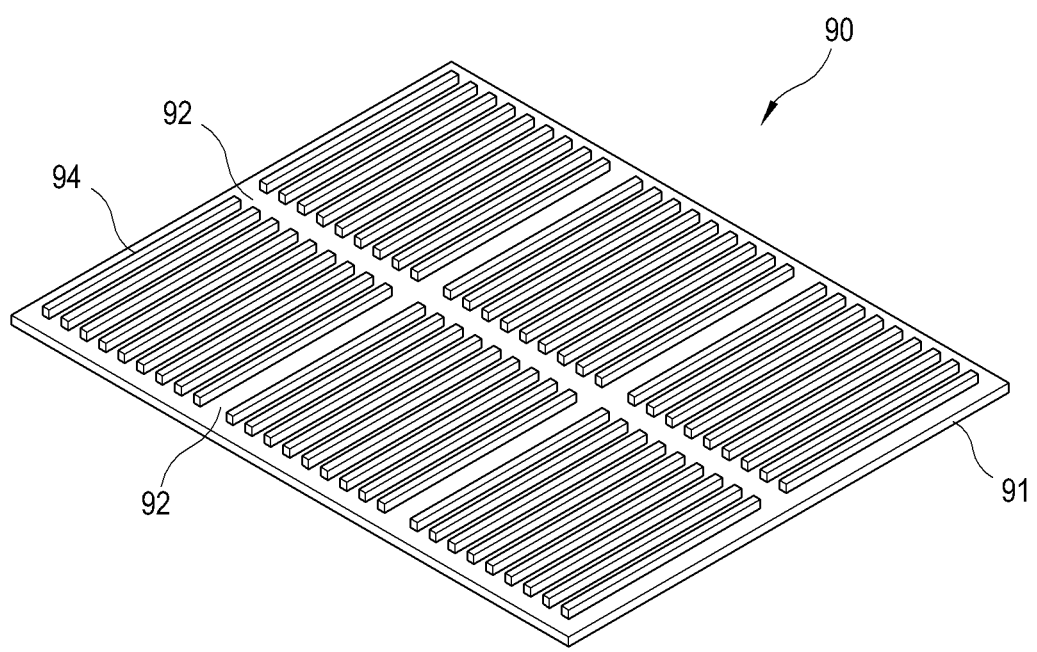
FIG. 9 is a diagram illustrating an example process of manufacturing a large-sized wire grid polarizer.

FIG. 9 is a diagram illustrating an example process of manufacturing a large-sized wire grid polarizer. As illustrated in FIG. 9, a manufacturer may, for example, apply an aluminum conductor or the like metal layer on to a glass substrate 91, and patterns grids on the metal layer by an exposure system or nano-imprint lithography or the like process, thereby forming unit grid patterns 94. However, individual unit grid patterns have a limited maximum size, and therefore such a process has to be performed repetitively when a large-sized display panel is manufactured. For example, to manufacture a large-sized wire grid polarizer 90, a manufacturer first forms the unit grid pattern 94 in a partial area on the glass substrate 91 applied with the metal layer, and then performs the process of forming the unit grid pattern 94 a plurality of times on the other areas on the glass substrate 91 applied with the metal layer, thereby forming the large-sized wire grid polarizer 90.

According to another example embodiment (not shown), a mold may be used for manufacturing the large-sized wire grid polarizer. A manufacturer may apply E-beam lithography to the glass substrate and manufactures a mold shaped corresponding to a grid pattern structure on an upper surface thereof. The manufacturer applies a resin on the glass substrate, and arranges the mold so that the upper surface having the shape corresponding to the grid pattern structure can face the resin. Then, the manufacturer presses the mold against the resin to thereby form the grid pattern on the glass substrate. The manufacturer applies ultraviolet rays to the resin pressed by the mold, and hardens the resin. The foregoing process has to be performed by a plurality of times so as to manufacture the large-sized display panel since there is a limit to the size of the mold. For example, it is possible to manufacture the large-sized wire grid polarizer by duplicating the grid pattern structure many times using the mold on the glass substrate.

During the process of manufacturing the large-sized wire grid polarizer 90, there may be disconformity, so called a seam area 92, in between the adjacent grid patterns 94. The seam area 92 causes a defect in an end product, e.g., an inferior image in the display panel and the display apparatus, and it is important to eliminate and/or reduce the seam area 92 during the manufacturing process.

As illustrated in FIG. 1, the first polarization-touch sensing layer 12 and the second polarization-touch sensing layer 14, which may, for example, be manufactured by the process illustrated in FIG. 9, respectively include the plurality of grid patterns 16 and 17 and seam areas 18 and 19 formed in between pairs of adjacent grid patterns 16 and 17. The polarization-touch sensing layer 12 and the second polarization-touch sensing layer 14 are arranged so that the grid patterns 16 and 17 respectively formed thereon may, for example, be perpendicular to each other. By this arrangement, the plurality of grid patterns 16 on the polarization-touch sensing layer 12 and the plurality of grid patterns 17 on the second polarization-touch sensing layer 13 can serve as a sensor line for transmitting and receiving a touch sensing signal through the seam areas 18 and 19. Thus, the display panel 10 according to an example embodiment can function as a touch screen by the polarization-touch sensing layer 12 and the second polarization-touch sensing layer 14 without an additional touch screen panel.

FIGS. 2 to 6 are diagrams illustrating various example embodiments of the display apparatus.

Figure 2:
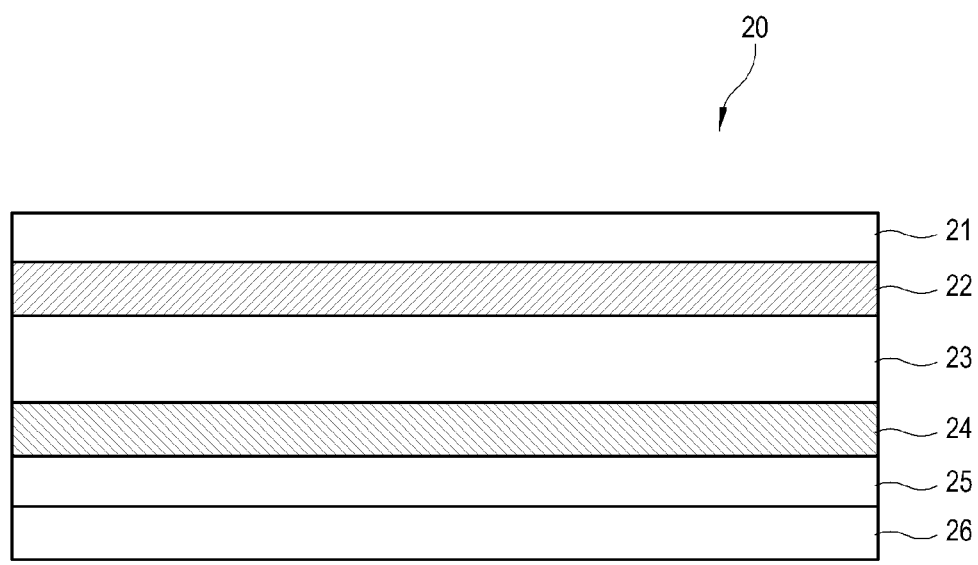
FIG. 2 is a cross-sectional view illustrating an example display panel including two polarization-touch sensing layers.

FIG. 2 is a cross-sectional view illustrating an example display panel including two polarization-touch sensing layers. As illustrated in FIG. 2, the display panel 20 includes a backlight unit 26, a first glass substrate 21, a second glass substrate 25, a liquid crystal layer 23, a polarization-touch sensing layer 22 and a second polarization-touch sensing layer 24. The display panel 20 may further include at least one of a polarizer and a touch sensing layer. The elements of the display panel 20 are not limited to this example embodiment, and may further include other elements. The first glass substrate 21 and the second glass substrate 25, the liquid crystal layer 23, the polarization-touch sensing layer 22 and the second polarization-touch sensing layer 24 respectively correspond, for example, to the first glass substrate 11 and the second glass substrate 15, the liquid crystal layer 13, the polarization-touch sensing layer 12 and the second polarization-touch sensing layer 14 described with reference to FIG. 1, and thus repetitive descriptions will be omitted.

The backlight unit 26 may be placed at a lower side of the display panel 20, and light emitted from the backlight unit 26 enters a lower surface of the display panel 20 and exits an upper surface of the display panel 20. According to an example embodiment, the backlight unit 26 may include a light source arranged at an edge region of the display panel 20, a light guide plate arranged in parallel with the display panel 20 and facing the lower surface of the display panel 20, a reflection plate arranged behind the light guide plate and facing a lower surface of the light guide plate, and one or more optical sheets interposed in between the display panel 20 and the light guide plate.

The light source is placed in at least one of the edges of the light guide plate, and may include a light emitting diode (LED) array, a cold cathode fluorescence lamp (CCFL), a hot cathode fluorescence lamp (HCFL), etc.

The light guide plate changes a traveling path of the light emitted from the light source, and guides the light to enter the display panel 20 in the form of flat light. The light guide plate may, for example, be formed by a transparent panel made of acrylic or the like plastic material. A rear surface of the light guide plate may be formed with various patterns for making the light incident to the light guide plate travel toward the display panel 20.

The reflection plate is installed on the lower surface of the light guide plate and reflects the light exiting from the lower surface of the light guide plate upward. For example, light, which is not reflected from fine dot patterns formed on the rear of the light guide plate, is reflected again toward an exit surface of the light guide plate, thereby decreasing loss of light entering the display panel 20 and improving uniformity of light exiting the exit surface of the light guide plate.

One or more optical sheets may be installed on the exit surface of the light guide plate, and serve to diffuse and collimate the light exiting the light guide plate. The optical sheet may include, for example, a diffusing sheet, a prism sheet, a protection sheet, etc. The diffusing sheet is positioned in between the light guide plate and the prism sheet, and diffuses the light exiting the light guide plate so as to prevent and/or reduce the light from being partially concentrated. The prism sheet includes predetermined solid prisms regularly arrayed on an upper surface thereof, and collimates the light diffused by the diffusing sheet so that the light can perpendicularly enter the display panel 20. The protection sheet is formed on the prism sheet, thereby not only protecting the surface of the prism sheet but also aiding in providing uniform light. According to an example embodiment, an edge-type backlight unit is described as an example of the backlight unit 26, but is not limited thereto. For example, a direct-type backlight unit may be employed as the backlight unit 26.

The polarization-touch sensing layer 22 and the second polarization-touch sensing layer 24 are stacked on the top and lower surfaces of the liquid crystal layer 23, respectively. The polarization-touch sensing layer 22 includes a plurality of wire grid areas where grid patterns are respectively arrayed to polarize the incident light from the backlight unit 26 and communicate a plurality of touch sensing signals for sensing a user's touch. Each of the grid patterns arrayed on the plurality of wire grid areas may, for example, be formed by the etching process of applying the exposure system or the nano-imprint lithography to the metal layer for forming the polarization-touch sensing layer 22. The plurality of grid patterns formed on the polarization-touch sensing layer 22 may have a certain size due to limitation in the processes.

The polarization-touch sensing layer 22 includes a conductive area provided in between the plurality of wire grid areas and carrying or communicating a touch sensing signal between a pair of adjacent grid patterns among the plurality of grid patterns, and a plurality of seam areas having a nonconductive area where the plurality of touch sensing signals are not communicated between the pair of grid patterns. The conductive area is a partial area of the seam area formed in between the plurality of wire grid areas on the polarization-touch sensing layer 22, and is also electrified between the pair of adjacent grid patterns since the metal layer of the polarization-touch sensing layer 22 is not etched. The nonconductive area is the area of the seam other than the conductive area of the seam area formed in between the plurality of wire grid areas on the polarization-touch sensing layer 22, and exposes an dielectric portion corresponding to the first glass substrate 21 by etching the metal layer of the polarization-touch sensing layer 22 in the form of a grid pattern having a predetermined size. The etched nonconductive area is, for example, a nonconductive dielectric so that the pair of adjacent grid patterns cannot be electrified.

According to an example embodiment, the seam area formed in between the plurality of wire grid areas on the polarization-touch sensing layer 22 may, for example, be formed by leaving a space of, for example, 1 micrometer (μm) or greater due to the process of the current large-scale equipment. For example, if the seam area is formed leaving a space of 1 μm or greater, the whole area of the polarization-touch sensing layer 22 cannot materialize a touch-screen panel since it forms a single conductive plate. For this reason, the nonconductive area etched to have a predetermined size and a predetermined shape is formed in the seam area so as to prevent the whole polarization-touch sensing layer 22 from electrification, thereby preventing electrification between the pair of adjacent grid patterns. The width of the nonconductive area is larger than the space of the seam area, thereby preventing electrification between the pair of grid patterns leaving the nonconductive area therebetween.

The second polarization-touch sensing layer 24 is arranged opposite the polarization-touch sensing layer 22 with the liquid crystal layer 23 therebetween. The second polarization-touch sensing layer 24 polarizes the incident light from the backlight unit 26, and includes the plurality of second wire grid areas in which the second grid patterns are respectively arranged for communicating the plurality of touch sensing signals for sensing a user's touch. Each of the second grid patterns respectively arranged on the plurality of second wire grid areas may be formed by applying the etching process based on the exposure system or the nano-imprint lithography to the metal layer forming the polarization-touch sensing layer 24. For example, the plurality of second grid patterns formed on the second polarization-touch sensing layer 24 may be provided to have a certain size due to limitation in the process.

Further, the second polarization-touch sensing layer 24 includes a conductive area provided in between the plurality of second wire grid areas and transmitting a touch sensing signal between a pair of adjacent second grid patterns among the plurality of second grid patterns, and a plurality of second seam areas having a nonconductive area where the plurality of touch sensing signals are not transmitted between the pair of second grid patterns. The conductive area is a partial area of the second seam area formed in between the plurality of second wire grid areas on the second polarization-touch sensing layer 24, and is also electrified between the pair of adjacent second grid patterns since the metal layer of the second polarization-touch sensing layer 24 is not etched. The nonconductive area is an area of the seam other than conductive area of the second seam area formed in between the plurality of second wire grid areas on the second polarization-touch sensing layer 24, and exposes an dielectric portion corresponding to the second glass substrate 25 by etching the metal layer of the second polarization-touch sensing layer 24 in the form of a grid pattern having a predetermined size. The etched nonconductive area is a nonconductive dielectric so that the pair of adjacent second grid patterns cannot be electrified.

The second grid pattern of the second polarization-touch sensing layer 24 is arranged perpendicularly intersecting the grid pattern of the polarization-touch sensing layer 22. According to an example embodiment, to realize the touch screen using the polarization-touch sensing layer 22 and the second polarization-touch sensing layer 24, the second grid pattern of the second polarization-touch sensing layer 24 may be used to transmit the touch sensing signal, and the grid pattern of the polarization-touch sensing layer 22 may be used to receive the touch sensing signal.

For example, the second grid pattern of the second polarization-touch sensing layer 24 stacked on the lower surface of the liquid crystal layer 23 may, for example, be used as a plurality of voltage supplying lines for transmitting a voltage pulse corresponding to a touch sensing signal, and the grid pattern of the polarization-touch sensing layer 22 stacked on the upper surface of the liquid crystal layer 23 and arranged opposite the second polarization-touch sensing layer 24 may be used as a plurality of receiving lines perpendicularly intersecting the plurality of voltage supplying lines. If a voltage pulse having a predetermined level is applied to the second grid pattern used as the voltage supplying line, an electromagnetic field is formed between the voltage supplying line and the receiving line, thereby coupling a voltage of a predetermined level to the receiving line. For example, if a user's hand approaches the display, a part of the electromagnetic field is absorbed in his/her hand and therefore total energy received in the receiving line is reduced. Such a change in the energy causes a voltage change in the receiving line, and it is thus possible to determine a position where the touch occurs based on the voltage change. The number of voltage supplying lines and receiving lines may be varied depending on the size of the display, and some lines may be activated and the other lines may be left as a dummy pattern by taking sensitivity of a touch into account.

The grid pattern of the polarization-touch sensing layer 22 stacked on the upper surface of the liquid crystal layer 23 may be used as the plurality of voltage supplying lines for transmitting the voltage pulse corresponding to the touch sensing signal, and the second grid pattern of the second polarization-touch sensing layer 24 stacked on the lower surface of the liquid crystal layer 23 and arranged opposite the polarization-touch sensing layer 22 may be used as the plurality of receiving lines perpendicularly intersecting the plurality of voltage supplying lines.

To realize the touch screen according to this example embodiment illustrated in FIG. 2, the grid pattern of the polarization-touch sensing layer 22 and the second grid pattern of the second polarization-touch sensing layer 24 may be respectively employed as the voltage supplying line and the receiving line, or as the receiving line and the voltage supplying line.

Figure 3:
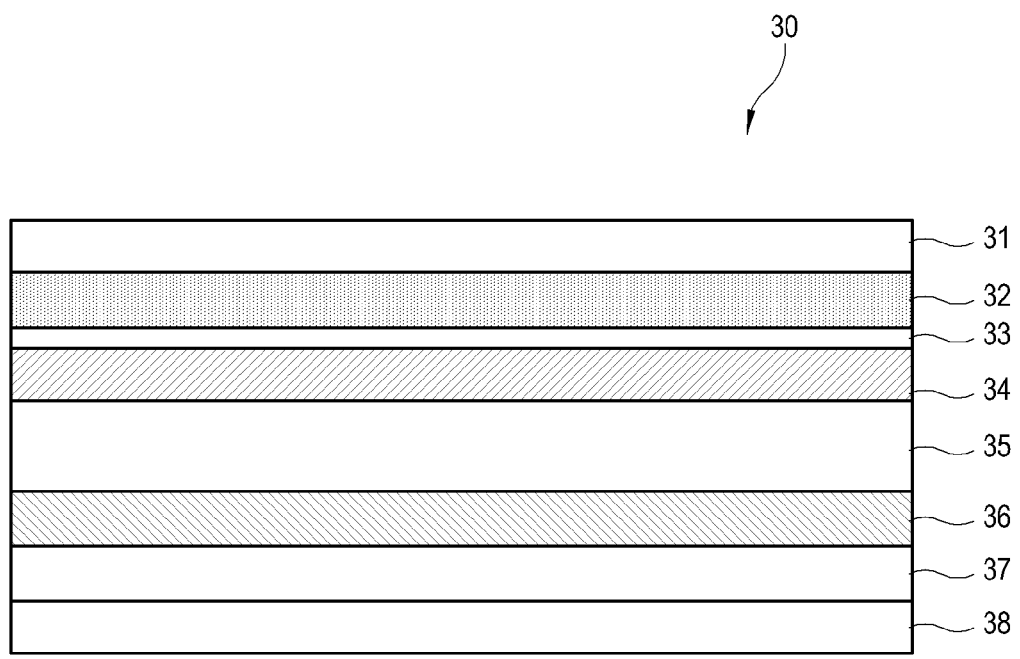
FIG. 3 is a cross-sectional view illustrating an example display panel including a polarization layer, a touch sensing layer and a polarization-touch sensing layer.

FIG. 3 is a cross-sectional view illustrating an example display panel including a polarization layer, a touch sensing layer and a polarization-touch sensing layer. As illustrated in FIG. 3, a display panel 30 may include a backlight unit 38, a first glass substrate 31 and a second glass substrate 37, a liquid crystal layer 35, a touch sensing layer 32, a dielectric layer 33, a polarization-touch sensing layer 34, and a polarization layer 36. The elements of the display panel 30 are not limited to this example embodiment, and may include various additional elements. Here, the backlight unit 38, the polarization-touch sensing layer 34, the first glass substrate 31, the second glass substrate 37 and the liquid crystal layer 35 respectively correspond to the backlight unit 26 and the polarization-touch sensing layer 22 of FIG. 2 and the first glass substrate 11, the second glass substrate 15 and the liquid crystal layer 13 of FIG. 1, and thus repetitive descriptions thereof may be omitted as necessary.

The polarization layer 36 is stacked on the lower surface of the liquid crystal layer 35. The polarization layer 36 may be realized by a wire grid polarizer that transmits predetermined polarized light of incident light from the backlight unit 38 but reflects the other polarized light. Thus, the polarization layer 36 may be realized by the wire grid polarizer and performs a function of polarizing a part of incident light.

The polarization-touch sensing layer 34 is stacked on the upper surface of the liquid crystal layer 35. The polarization-touch sensing layer 34 may serve to not only polarize a part of the incident light but also perform a touch sensing function using the plurality of grid patterns as the plurality of voltage supplying lines for transmitting the voltage pulse corresponding to the touch sensing signal or as the receiving line for measuring a voltage change due to a touch while an electric current flows in the voltage supplying line.

A dielectric layer 33 is interposed in between the polarization-touch sensing layer 34 and the touch sensing layer 32 and is made of a nonconductive material.

The touch sensing layer 32 is stacked on the upper surface of the dielectric layer 33, and includes an element for sensing a touch. The touch sensing layer 32 may be realized by a transmitting sensor layer or a receiving sensor layer for sensing a user's touch input, and have a GFF or G2 structure using a transparent electrode such as indium tin oxide (ITO), a metal mesh, an Ag nano-wire, etc. or a flexible printed circuit board (FPCB) where a conductive material is applied to a substrate made of an opaque and flexible film.

According to an example embodiment, if the touch sensing layer 32 is realized by the transmitting sensor layer, the touch sensing layer 32 may include the plurality of voltage supplying lines. For example, the touch sensing layer 32 may transmit a voltage pulse having a predetermined amplitude for sensing a touch input through the voltage supplying line. When the touch sensing layer 32 is realized by the transmitting sensor layer, the polarization-touch sensing layer 34 may serve as the receiving sensor layer, in which the plurality of grid patterns is arranged perpendicularly intersecting the plurality of voltage supplying lines of the touch sensing layer 32 and used as the plurality of receiving lines. When the voltage pulse having a predetermined amplitude is applied to the voltage supplying line of the touch sensing layer 32, an electromagnetic field is formed between the voltage supplying line and the receiving line of the polarization-touch sensing layer 34, thereby coupling a voltage of a predetermined level to the receiving line. For example, if a user's hand approaches the display, a part of the electromagnetic field is absorbed in his/her hand and therefore total energy received in the receiving line is reduced. Such a change in the energy causes a voltage change in the receiving line, and it is thus possible to determine a position where the touch occurs based on the voltage change.

If the touch sensing layer 32 is realized by the receiving sensor layer, the touch sensing layer 32 may include the plurality of receiving lines. For example, the polarization-touch sensing layer 34 may serve as the transmitting sensor layer, in which the plurality of grid patterns is arranged perpendicularly intersecting the plurality of receiving lines of the touch sensing layer 32 and used as the plurality of voltage supplying lines. When the voltage pulse having a predetermined amplitude is applied to the voltage supplying line of the polarization-touch sensing layer 34, an electromagnetic field is formed between the voltage supplying line and the receiving line of the touch sensing layer 32, thereby coupling a voltage of a predetermined level to the receiving line. For example, if a user's touch is sensed, a voltage changes in the receiving line and it is thus possible to determine a position where the touch occurs.

Figure 4:
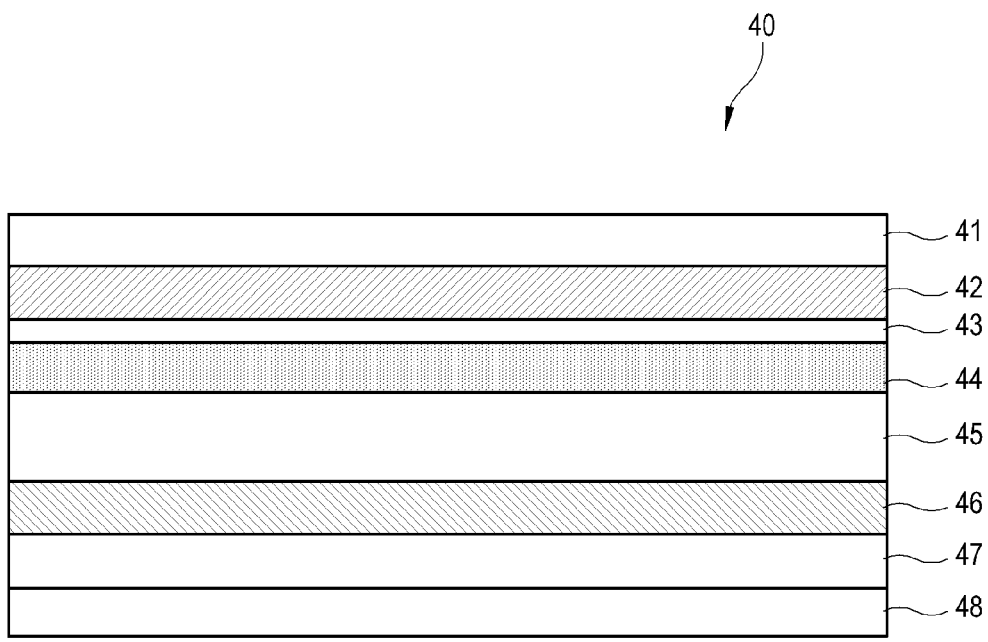
FIG. 4 is a cross-sectional view illustrating an example display panel including a polarization layer, a touch sensing layer and a polarization-touch sensing layer.

FIG. 4 is a cross-sectional view illustrating an example display panel including a polarization layer, a touch sensing layer and a polarization-touch sensing layer. As illustrated in FIG. 4, a display panel 40 may include, for example, a backlight unit 48, a first glass substrate 41, a second glass substrate 47, a liquid crystal layer 45, a touch sensing layer 44, a dielectric layer 43, a polarization-touch sensing layer 42 and a polarization layer 46. The elements of the display panel 40 are not limited to this example embodiment, and may include various additional elements. Here, the backlight unit 48, the polarization-touch sensing layer 42, the first glass substrate 41, the second glass substrate 47, the liquid crystal layer 45, the polarization layer 46, the touch sensing layer 44 and the dielectric layer 43 respectively correspond to the backlight unit 26 and the polarization-touch sensing layer 22 of FIG. 2, the first glass substrate 11, the second glass substrate 15 and the liquid crystal layer 13 of FIG. 1, and the polarization layer 36, the touch sensing layer 32 and the dielectric layer 33 of FIG. 3, and therefore repetitive descriptions thereof may be omitted as necessary.

The polarization-touch sensing layer 42 is interposed in between the first glass substrate 41 and the dielectric layer 43. The polarization-touch sensing layer 42 may serve not only to polarize a part of the incident light but may also perform a touch sensing function using the plurality of grid patterns as the plurality of voltage supplying lines for transmitting the voltage pulse corresponding to the touch sensing signal or as the receiving line for measuring a voltage change due to a touch while an electric current flows in the voltage supplying line.

The dielectric layer 43 is interposed in between the polarization-touch sensing layer 42 and the touch sensing layer 44 and made of a nonconductive material.

The touch sensing layer 44 is interposed in between the liquid crystal layer 45 and the dielectric layer 43, and includes an element for sensing a touch. The touch sensing layer 44 may be realized by a transmitting sensor layer or a receiving sensor layer for sensing a user's touch.

According to an example embodiment, if the touch sensing layer 44 is realized by the transmitting sensor layer, the touch sensing layer 44 may include the plurality of voltage supplying lines. For example, the touch sensing layer 44 may transmit a voltage pulse having a predetermined amplitude for sensing a touch input through the voltage supplying line. When the touch sensing layer 44 is realized by the transmitting sensor layer, the polarization-touch sensing layer 42 may serve as the receiving sensor layer, in which the plurality of grid patterns is arranged perpendicularly intersecting the plurality of voltage supplying lines of the touch sensing layer 44 and used as the plurality of receiving lines.

If the touch sensing layer 44 is realized by the receiving sensor layer, the touch sensing layer 44 may include the plurality of receiving lines. For example, the polarization-touch sensing layer 42 may serve as the transmitting sensor layer, in which the plurality of grid patterns is arranged perpendicularly intersecting the plurality of receiving lines of the touch sensing layer 44 and used as the plurality of voltage supplying lines.

Figure 5:
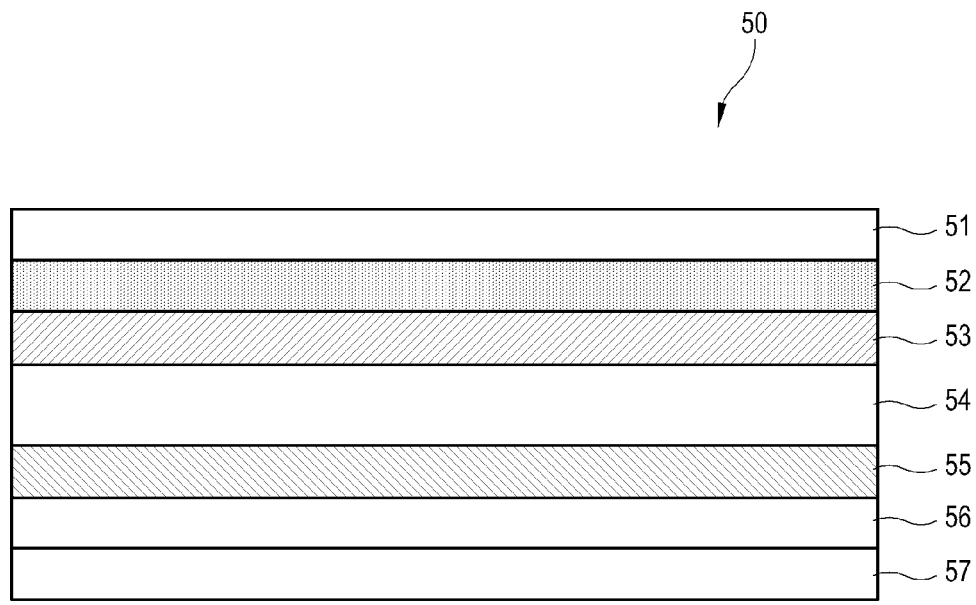
FIG. 5 is a cross-sectional view illustrating an example display panel including a polarization layer, a touch sensing layer and a polarization-touch sensing layer.

FIG. 5 is a cross-sectional view illustrating an example display panel including a polarization layer, a touch sensing layer and a polarization-touch sensing layer. As illustrated in FIG. 5, a display panel 50 may include, for example, a backlight unit 57, a first glass substrate 51, a second glass substrate 56, a liquid crystal layer 54, a touch sensing layer 52, a polarization layer 53 and a polarization-touch sensing layer 55. The elements of the display panel 50 are not limited to this example embodiment, and may include various additional elements. Here, the backlight unit 57, the polarization-touch sensing layer 55, the first glass substrate 51 and the second glass substrate 56, the liquid crystal layer 54, the polarization layer 53, and the touch sensing layer 52 respectively correspond to the backlight unit 26 and the polarization-touch sensing layer 22 of FIG. 2, the first glass substrate 11, the second glass substrate 15 and the liquid crystal layer 13 of FIG. 1, and the polarization layer 36 and the touch sensing layer 32 of FIG. 3, and thus repetitive descriptions thereof may be omitted, as necessary.

The polarization-touch sensing layer 55 is interposed in between the liquid crystal layer 54 and the second glass substrate 56.

The polarization layer 53 is interposed in between the liquid crystal layer 54 and the touch sensing layer 52. According to an example embodiment, the polarization layer 53 is realized by the wire grid polarizer and serves to polarize a part of the incident light.

The touch sensing layer 52 is interposed in between the first glass substrate 51 and the polarization layer 53, and includes an element for sensing a touch. To sense a user's touch input, the touch sensing layer 52 may be realized by the transmitting sensor layer or the receiving sensor layer.

According to an example embodiment, if the touch sensing layer 52 is realized by the transmitting sensor layer, the touch sensing layer 52 may include the plurality of voltage supplying lines. For example, the touch sensing layer 52 may transmit a voltage pulse having a predetermined amplitude for sensing a touch input through the voltage supplying line. When the touch sensing layer 52 is materialized by the transmitting sensor layer, the polarization-touch sensing layer 55 may serve as the receiving sensor layer, in which the plurality of grid patterns is arranged perpendicularly intersecting the plurality of voltage supplying lines of the touch sensing layer 52 and used as the plurality of receiving lines.

If the touch sensing layer 52 is realized by the receiving sensor layer, the touch sensing layer 52 may include the plurality of receiving lines. For example, the polarization-touch sensing layer 55 may serve as the transmitting sensor layer, in which the plurality of grid patterns is arranged perpendicularly intersecting the plurality of receiving lines of the touch sensing layer 52 and used as the plurality of voltage supplying lines.

Figure 6:
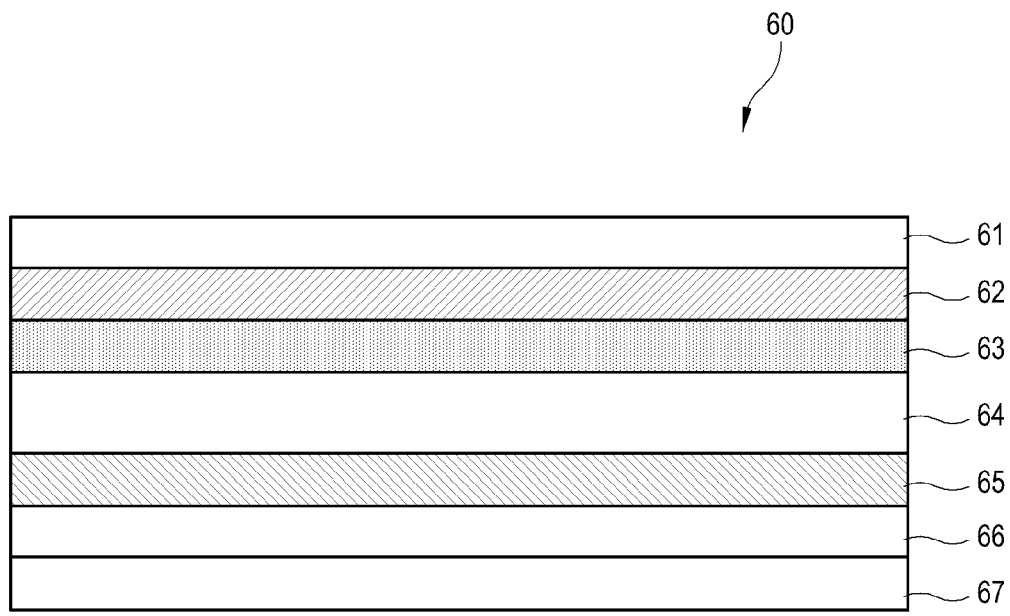
FIG. 6 is a cross-sectional view illustrating an example display panel including a polarization layer, a touch sensing layer and a polarization-touch sensing layer.

FIG. 6 is a cross-sectional view illustrating an example display panel including a polarization layer, a touch sensing layer and a polarization-touch sensing layer. As illustrated in FIG. 6, a display panel 60 may include, for example, a backlight unit 67, a first glass substrate 61, a second glass substrate 66, a liquid crystal layer 64, a touch sensing layer 63, a polarization layer 62, and a polarization-touch sensing layer 65. The elements of the display panel 60 are not limited to this example embodiment, and may include various additional elements. Here, the backlight unit 67, the polarization-touch sensing layer 65, the first glass substrate 61, the second glass substrate 66, the liquid crystal layer 64, the polarization layer 62 and the touch sensing layer 63 may correspond to the backlight unit 26 and the polarization-touch sensing layer 22 of FIG. 2, the first glass substrate 11, the second glass substrate 15 and the liquid crystal layer 13 of FIG. 1, and the polarization layer 36 and the touch sensing layer 32 of FIG. 3, and therefore repetitive descriptions thereof may be omitted, as necessary.

The polarization-touch sensing layer 65 is interposed in between the liquid crystal layer 64 and the second glass substrate 66.

The polarization layer 62 is interposed in between the first glass substrate 61 and the touch sensing layer 63, and may be realized by a wire grid polarizer that transmits predetermined polarized light of incident light from the backlight unit 67 but reflects the other polarized light.

The touch sensing layer 63 is interposed in between the liquid crystal layer 64 and the polarization layer 62 and includes an element for sensing a touch. The touch sensing layer 63 may be realized by a transmitting sensor layer or a receiving sensor layer in order to sense a user's touch input.

According to an example embodiment, if the touch sensing layer 63 is realized by the transmitting sensor layer, the touch sensing layer 63 may include a plurality of voltage supplying lines. For example, the touch sensing layer 63 may transmit a voltage pulse having a predetermined amplitude for sensing a touch input through the voltage supplying line. When the touch sensing layer 63 is realized by the transmitting sensor layer, the polarization-touch sensing layer 65 may serve as the receiving sensor layer, in which the plurality of grid patterns are arranged perpendicularly intersecting the plurality of voltage supplying lines of the touch sensing layer 63 and used as the plurality of receiving lines.

If the touch sensing layer 63 is realized by the receiving sensor layer, the touch sensing layer 63 may include the plurality of receiving lines. For example, the polarization-touch sensing layer 65 may serve as the transmitting sensor layer, in which the plurality of grid patterns is arranged perpendicularly intersecting the plurality of receiving lines of the touch sensing layer 63 and used as the plurality of voltage supplying lines.

Figure 7:
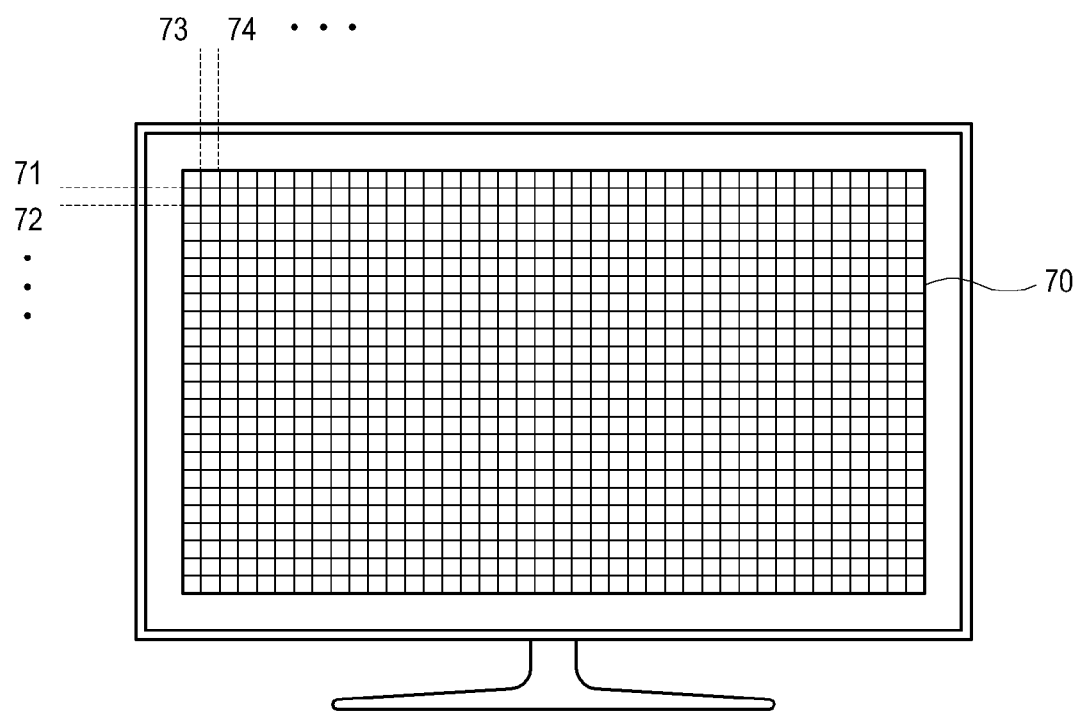
FIG. 7 is a diagram illustrating an example of a touch screen employing a polarization-touch sensing layer.

FIG. 7 is a diagram illustrating an example of a touch screen employing a polarization-touch sensing layer. As described in FIG. 2 to FIG. 6, the display panel is variously configured to include at least one the polarization-touch sensing layer, and selectively includes at least one of the polarization layer and the touch sensing layer, thereby having effects on both polarizing a part of the incident light from the light source and sensing a user's touch. The touch screen 70 based on the display panel includes, for example, the transmitting sensor layer and the receiving sensor layer, in which the transmitting sensor layer includes the plurality of voltage supplying lines 71, 72, . . . , and the receiving sensor layer includes the plurality of receiving lines 73, 74, . . . .

While the voltage pulse having a predetermined amplitude flows in the plurality of voltage supplying lines 71, 72, . . . , an electromagnetic field is formed between the voltage supplying lines and the plurality of receiving lines 73, 74, . . . , thereby coupling a voltage having a predetermined level to the plurality of receiving lines 73, 74, . . . . For example, if a user's hand approaches the display, a part of the electromagnetic field is absorbed in his/her hand and therefore total energy received in the receiving line 73, 74, . . . is reduced. Such a change in the energy causes a voltage change in the receiving lines 73, 74, . . . , and it is thus possible to determine a position where the touch occurs based on the voltage change. The plurality of voltage supplying lines 71, 72, . . . and the plurality of receiving lines 73, 74, . . . may be varied in number depending on the size of the display, and some lines may be activated and the other lines may be left as a dummy pattern by taking sensitivity of a touch into account.

According to an example embodiment, as illustrated in FIG. 2, if the touch screen 70 includes two polarization-touch sensing layers, the transmitting sensor layer may be realized by the second polarization-touch sensing layer 24 of the display panel 20, and the receiving sensor layer may be realized by the polarization-touch sensing layer 22. For example, the plurality of second grid patterns formed on the second polarization-touch sensing layer 24 are used as the plurality of voltage supplying lines 71, 72, . . . for the transmitting sensor layer, and the plurality of grid patterns formed on the polarization-touch sensing layer 22 are used as the plurality of receiving lines 73, 74, . . . , for the receiving sensor layer. In the example structure of FIG. 2, the transmitting sensor layer may be realized by the polarization-touch sensing layer 22, and the receiving sensor layer may be realized by the second polarization-touch sensing layer 24.

As illustrated in FIGS. 3 and 4, if the polarization-touch sensing layer 34, 42 and the touch sensing layer 32, 44 are stacked on the liquid crystal layer 35, the transmitting sensor layer of the touch screen 70 may be realized by the touch sensing layer 32, 44 of the display panel 30, 40, and the receiving sensor layer may be realized by the polarization-touch sensing layer 34, 42. The touch sensing layer 32, 44 includes the plurality of voltage supplying lines 71, 72, . . . , and the plurality of grid patterns formed on the polarization-touch sensing layer 34, 42 are used as the plurality of receiving lines 73, 74, . . . of the receiving sensor layer. In the example structure of FIG. 3, the transmitting sensor layer may be realized by the polarization-touch sensing layer 34, 42, and the receiving sensor layer may be realized by the touch sensing layer 32, 44.

As illustrated in FIGS. 5 and 6, if the touch sensing layer 52, 63 is positioned on the liquid crystal layer 54, 64, and the polarization-touch sensing layer 55, 65 is positioned beneath the liquid crystal layer 54, 64, the transmitting sensor layer of the touch screen 70 may be realized by the touch sensing layer 52, 63 of the display panel 50, 60, and the receiving sensor layer may be realized by the polarization-touch sensing layer 55, 65. The touch sensing layer 52, 63 includes the plurality of voltage supplying lines 71, 72, . . . , and the plurality of grid patterns formed on the polarization-touch sensing layer 55, 65 may be used as the plurality of receiving lines 73, 74, . . . for the receiving sensor layer. The transmitting sensor layer may be realized by the polarization-touch sensing layer 55, 65, and the receiving sensor layer may be materialized by the touch sensing layer 52, 63.

Figure 10:
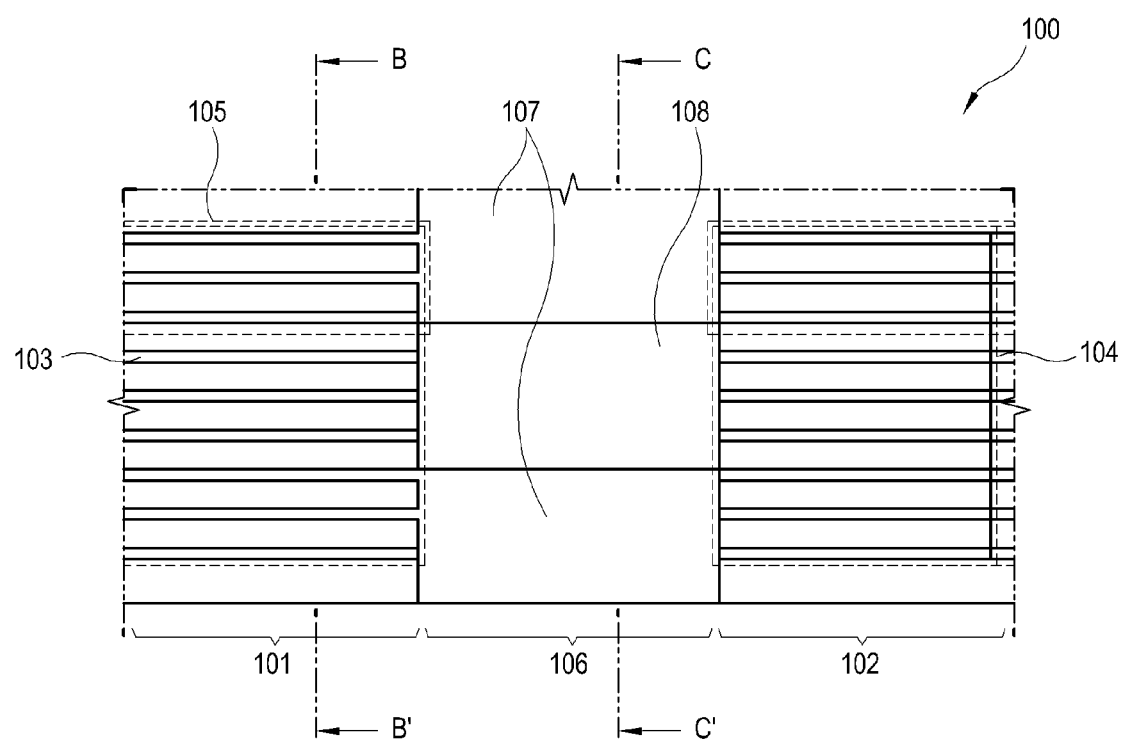
FIG. 10 is an enlarged view of (A) in FIG. 1, illustrating an example of two adjacent wire grid areas and a seam area in a polarization-touch sensing layer.

FIG. 10 is a diagram illustrating an enlarged view of (A) in FIG. 1, which illustrates two adjacent wire grid areas and a seam area in a polarization-touch sensing layer. As illustrated in FIG. 10, the polarization-touch sensing layer 100 includes the plurality of wire grid areas. Among them, a first wire grid area 101 and the second wire grid area 102, which are adjacent to each other, will be representatively described by way of example.

As illustrated in FIG. 9, the polarization-touch sensing layer 100 is formed with the plurality of wire grid areas by applying a conductive metal layer such as aluminum on to the glass substrate 91, and then patterning the metal layer to have the grid patterns 94 having a predetermined size through the exposure system, the nano-imprint lithography or the like process.

The first wire grid area 101 and the second wire grid area 102 correspond to a part of the plurality of wire grid areas formed on the polarization-touch sensing layer 100. The first wire grid area 101 and the second wire grid area 102 are used to transmit a polarized component of the incident light from the backlight unit (not shown), which oscillates in a direction perpendicular to a first grid pattern 103 and a second grid pattern 104, but reflect the polarized component, which oscillates in a direction parallel with the first grid pattern 103 and the second grid pattern 104, to be used again. Further, the first grid pattern 103 and the second grid pattern 104 respectively arranged on the first wire grid area 101 and the second wire grid area 102 are also used to carry a plurality of touch sensing signals for sensing a user's touch.

A seam area 106 is disposed in between the first wire grid area 101 and the second wire grid area 102, and includes a conductive area 107 through which a touch sensing signal is communicated or transmitted between the first grid pattern 103 and the second grid pattern 104, and a nonconductive area 108 through which the touch sensing signal is not communicated or transmitted between the first grid pattern 103 and the second grid pattern 104.

The conductive area 107 is a partial area of the seam area 106, which corresponds to the metal layer of the polarization-touch sensing layer 100 remaining after the etching process, and allows an electric current corresponding to the touch sensing signal to flow between the first grid pattern 103 and the second grid pattern 104 which are adjacent to each other.

The nonconductive area 108 is an area other than the conductive area 107 in the seam area 106, which corresponds to the metal layer of the polarization-touch sensing layer 100 that is removed as a result of the etching process, and prevents an electric current corresponding to the touch sensing signal from flowing between the first grid pattern 103 and the second grid pattern 104 which are adjacent to each other. For example, the nonconductive area 108 may be formed by etching a grid pattern having a predetermined size on the metal layer of the polarization-touch sensing layer 100, and may be made of a nonconductive dielectric so as to prevent an electric current from flowing between the first grid pattern 103 and the second grid pattern 104 which are adjacent to each other.

According to an example embodiment, the seam area 106 formed in between the first wire grid area 101 and the second wire grid area 102 on the polarization-touch sensing layer 100 may correspond to a space of, for example, 1 micrometer (μm) or greater due to a process in the current large-format equipment. If the seam area 106 has a space of 1 micrometer (μm) or greater, it is impossible to achieve the touch-screen panel since the metal layer forming the seam area 106 makes the whole area of the polarization-touch sensing layer 100 become as a single conducive plate. For this reason, the nonconductive area 108 is formed on the seam area 106 in order to prevent the electrification of the whole polarization-touch sensing layer 100, thereby preventing an electric current from flowing between the first grid pattern 103 and the second grid pattern 104 adjacent to each other. The nonconductive area 108 may be patterned in the form of a square grid. The width of nonconductive area 108 may be larger than the space of the seam area 106. The nonconductive area 108 are not limited to the size and etched pattern described above, but may be formed to have various sizes and patterns.

Each of the first grid pattern 103 and the second grid pattern 104 may include a plurality of grid sub-groups 105 for transmitting or communicating a plurality of touch sensing signals, respectively. For example, some grids of the first grid pattern 103 and the second grid pattern 104 are grouped into the plurality of grid sub-groups 105, so that the plurality of touch sensing signals can be respectively communicated or transmitted through the plurality of grid sub-groups 105. The plurality of touch sensing signals can be transmitted from the plurality of grid sub-groups 105 to the plurality of adjacent grid sub-groups via the conductive area 107. The plurality of grid sub-groups 105 are not formed by grouping all the grids of the first grid pattern 103 and the second grid pattern 104, and may be formed by grouping the grids positioned corresponding to the conductive area 107.

The plurality of conductive areas 107 made of the metal layer may be provided to respectively correspond to the plurality of grid sub-groups 105. For example, the conductive areas 107 are arranged respectively corresponding to the plurality of grid sub-groups 105, so that the touch sensing signal can be effectively communicated or transmitted between the pair of adjacent grid sub-groups 105 with the conductive area 107 therebetween.

The conductive areas 107 may, for example, be made of the same conductive material as the first grid pattern 103 and the second grid pattern 104, and allows the touch sensing signal to be effectively communicated or transmitted between the respective grid sub-groups of the first grid pattern 103 and the second grid pattern 104 with the conductive area 107 therebetween.

The first grid pattern 103 and the second grid pattern 104 may be respectively formed on the first wire grid area 101 and the second wire grid area 102 by etching the metal layer of the polarization-touch sensing layer 100 except the conductive area 107. According to an example embodiment, the first wire grid area 101 and the second wire grid area 102 may be etched on the polarization-touch sensing layer 100 while leaving the conductive area 107, so that the first grid pattern 103 and the second grid pattern 104 can be patterned in the form of a plurality of grids arranged in parallel with each other. The first grid pattern 103 and the second grid pattern 104 are made of a conductive metal layer, and it is thus possible to effectively form the plurality of grid sub-groups 105 and the conductive area 107.

The nonconductive area 108 may be formed to have a predetermined size in order to prevent electrification between the first grid pattern 103 and the second grid pattern 104, which are adjacent to each other with the nonconductive area 108 therebetween. According to an example embodiment, the width of the nonconductive area 108 may be larger than the space of the seam area 106, thereby preventing the touch sensing signal from being transmitted between the first grid pattern 103 and the second grid pattern 104. The nonconductive area 108 prevents the touch sensing signal from interference between the plurality of grid sub-groups, thereby more effectively achieving the electrification between the grid sub-group 105 and the conductive area 107.

The first grid pattern 103 and the second grid pattern 104 are separated from each other with the nonconductive area 108 therebetween. For example, the metal layer is partially removed by the etching process in the seam area 106 between the first grid pattern 103 and the second grid pattern 104, which are adjacent to each other, thereby preventing the touch sensing signal from flowing between the first grid pattern 103 and the second grid pattern 104.

The nonconductive area 108 may be formed in the seam area 106 by applying the etching process to the metal layer of the polarization-touch sensing layer 100 except the conductive area 107. For example, the nonconductive area 108 is etched to have a predetermined size in the seam area 106 between the first grid pattern 103 and the second grid pattern 104, so that the nonconductive area 108 can prevent the electrification between the first grid pattern 103 and the second grid pattern 104. According to an example embodiment, the nonconductive area 108 may be formed by the etching process as a square grid having a predetermined size in between the first grid pattern 103 and the second grid pattern 104. Thus, the nonconductive area 108 is formed by etching the metal layer except the conductive area for the electrification in the seam area, thereby effectively forming the grid sub-group of the grid pattern and the corresponding conductive area.

Figure 11:
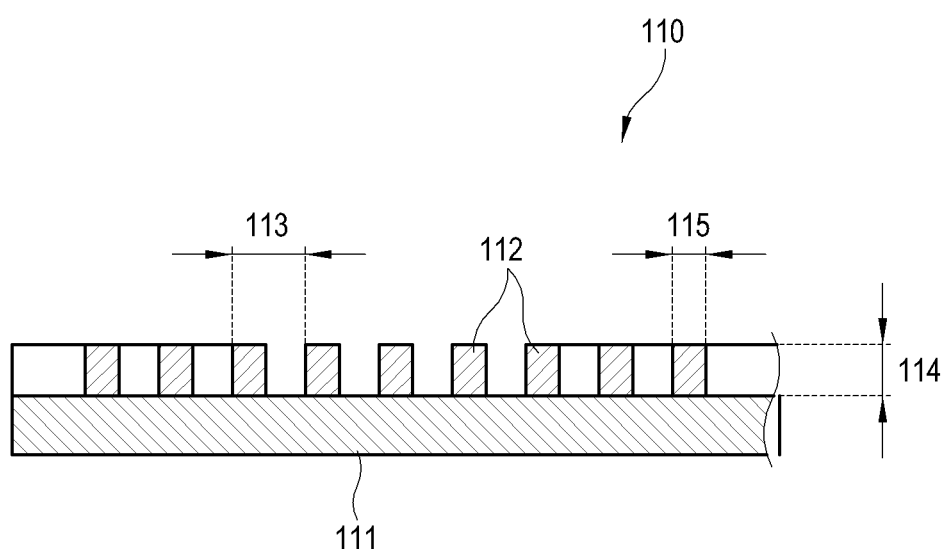
FIG. 11 is a cross-sectional view illustrating an example first wire grid area, taken along line (BB') in FIG. 10.

FIG. 11 is a cross-sectional view illustrating an example first wire grid area, taken along line (BB') in FIG. 10. As illustrated in FIG. 11, a first wire grid area 110 corresponds to the first wire grid area 101 of FIG. 10. The first wire grid area 110 is configured to include a nonconductive dielectric 111 such as an under glass substrate and a grid pattern 112 formed on the dielectric 111. The first wire grid area 110 is formed, for example, by applying aluminum or the like conductive metal layer to the dielectric 111 such as the glass substrate, and patterning and arranging the grid pattern 112 on the metal layer through the exposure system, the nano-imprint lithography or the like process.

The grid pattern 112 serves to transmit a polarized component of light, and has a pitch 113 capable of transmitting all wavelengths of the incident light. For example, the pitch 113 may be shorter than half a wavelength of light. According to an example embodiment, the grid pattern 112 may have a grid height 114 of about 150~200 nanometer (nm), and a pitch 113 of about 100~150 (nm). The ratio of height 114 to width 115 in the grid may be adjusted not to be smaller than about 1:3.

Figure 12:
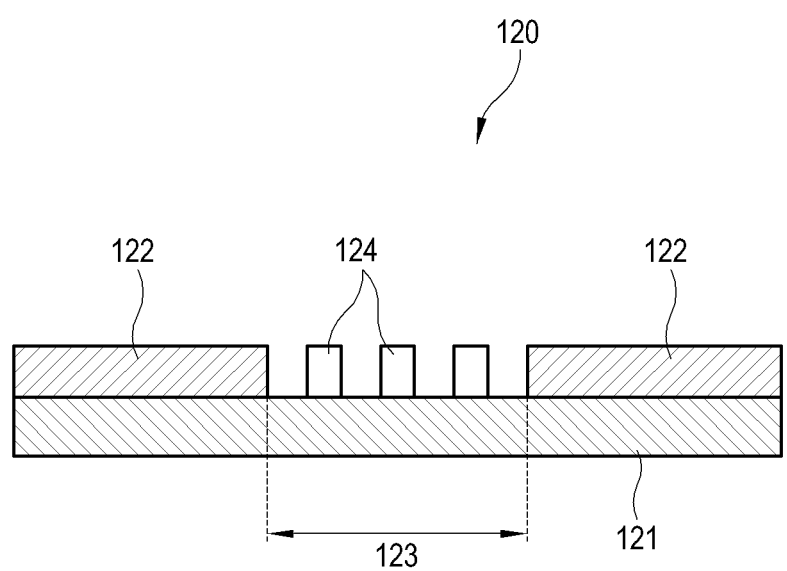
FIG. 12 is a cross-sectional view of the seam area, taken along line (CC') in FIG. 10.

FIG. 12 is a cross-sectional view illustrating an example seam area, taken along line (CC') in FIG. 10. As illustrated in FIG. 12, a seam area 120 corresponds to the seam area 106 of FIG. 10. The seam area 120 includes a conductive area 122 made of a conductive metal layer applied on to a nonconductive dielectric 121 such as the glass substrate, and a nonconductive area 123 formed by etching the metal layer applied to the dielectric 121.

The conductive area 122 is interposed between the first grid pattern 103 and the second grid pattern 104 of FIG. 10, and made of a conductive metal layer so as to electrify the first grid pattern 103 and the second grid pattern 104. For example, the conductive area 122 may be provided corresponding to the plurality of grid sub-groups 105 for respectively electrifying the plurality of touch sensing signals.

The nonconductive area 123 is provided together with the conductive area 122 in between the first grid pattern 103 and the second grid pattern 104 of FIG. 10, and formed of the nonconductive dielectric 121 by the etching process so as to electrically disconnect the first grid pattern 103 and the second grid pattern 104.

According to an example embodiment, the seam area 120 may correspond to a space of 1 micrometer (μm) or greater by the process of the current large-format equipment, and may be formed with the nonconductive area 123 etched to have a predetermined size in the seam area in order to prevent the electrification of the whole polarization-touch sensing layer 100 of FIG. 10, thereby preventing the electrification between the first grid pattern 103 and the second grid pattern 104 that are adjacent to each other. The width of the nonconductive area 123 may be larger than the space of the seam area 120. The nonconductive area 123 may be provided in the form of the square grid. The nonconductive area 123 is not limited to the size and etched pattern according to an example embodiment, but may be formed to have various sizes and patterns.

A grid pattern 124 formed on the nonconductive area 123 corresponds to the first grid pattern 103 of FIG. 10. The grids of the grid pattern 124 transmits a polarized component of the incident light from the backlight (not shown), which oscillates in a direction perpendicular to the grids, and reflects a polarized component, which oscillates in a direction parallel with the grids, to be used again. Further, the grid pattern 124 transmits the plurality of touch sensing signals for sensing a user's touch.

The nonconductive area 123 is separated from the grid pattern 124 made of the conductive metal layer by the etching process and prevents the electrification between the pair of adjacent grid patterns. For example, the nonconductive area 123 serves to prevent the electrification between the grids of the first grid pattern 103 and the second grid pattern 104, which are adjacent to the nonconductive area 123, in the polarization-touch sensing layer 100 of FIG. 10.

Figure 13:
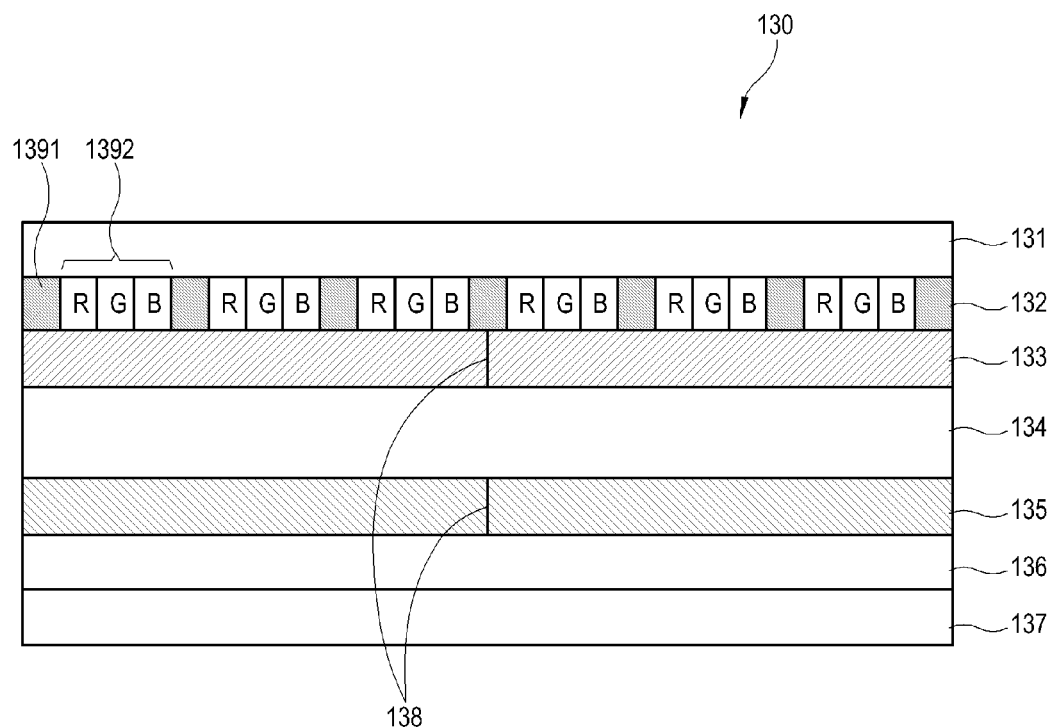
FIG. 13 is a cross-sectional view illustrating an example display panel including a black matrix and a color-filter layer.

FIG. 13 is a cross-sectional view illustrating an example display panel including a black matrix and a color-filter layer. As illustrated in FIG. 13, a display panel 130 includes a backlight unit 137, a first glass substrate 131, a second glass substrate 136, a liquid crystal layer 134, a polarization-touch sensing layer 133, a second polarization-touch sensing layer 135, a black matrix and pixel layer 132. The elements of the display panel 130 according to this example embodiment are not limited, and may include various additional elements. The backlight unit 137, the first glass substrate 131, the second glass substrate 136, the liquid crystal layer 134, the polarization-touch sensing layer 133 and the second polarization-touch sensing layer 135 respectively correspond to the backlight unit 26, the first glass substrate 21, the second glass substrate 25, the liquid crystal layer 23, the polarization-touch sensing layer 22 and the second polarization-touch sensing layer 24 of FIG. 2, and thus repetitive descriptions thereof may be omitted, as necessary.

The black matrix and pixel layer 132 is interposed in between the first glass substrate 131 and the polarization-touch sensing layer 133. The black matrix and the pixel layer 132 may, for example, be provided as one element according to this example embodiment. A black matrix and a pixel layer may be separately provided and stacked in between the first glass substrate 131 and the polarization-touch sensing layer 133.

In the black matrix and pixel layer 132, a pixel layer has a structure of, for example, a thin film transistor (TFT), in which electrodes are controlled to adjust a liquid crystal array of the liquid crystal layer 134 in units of pixel. Each pixel may include, for example, a plurality of sub-pixels 1392. According to an example embodiment, the sub-pixels 1392 may refer to the smallest pixels, to which image grayscales corresponding to red, green and blue are input, and the plurality of sub-pixels 1392 corresponding to one image signal will be defined as a pixel.

A black matrix 1391 serves as a partition for the plurality of sub-pixels 1392, and prevents external light from being introduced into the liquid crystal layer 134. The black matrix 1391 may, for example, be made of a photosensitive organic material added with a black pigment such as carbon black, titanium oxide, etc.

The black matrix 1391 may be arranged to overlap at least a part of a seam area 138 so that the seam area 138 is not seen from a viewing direction of the display panel 130. The seam area 138 should not be seen since a seam between the plurality of grid patterns formed in the polarization-touch sensing layer 133 and the second polarization-touch sensing layer 135 of the display panel 130 may cause a defect of the display panel 130. Therefore, the seam area 138 is arranged to overlap the black matrix 1391 for blocking out the external light, so that the seam area 138 cannot be seen from the viewing direction.

Figure 14:
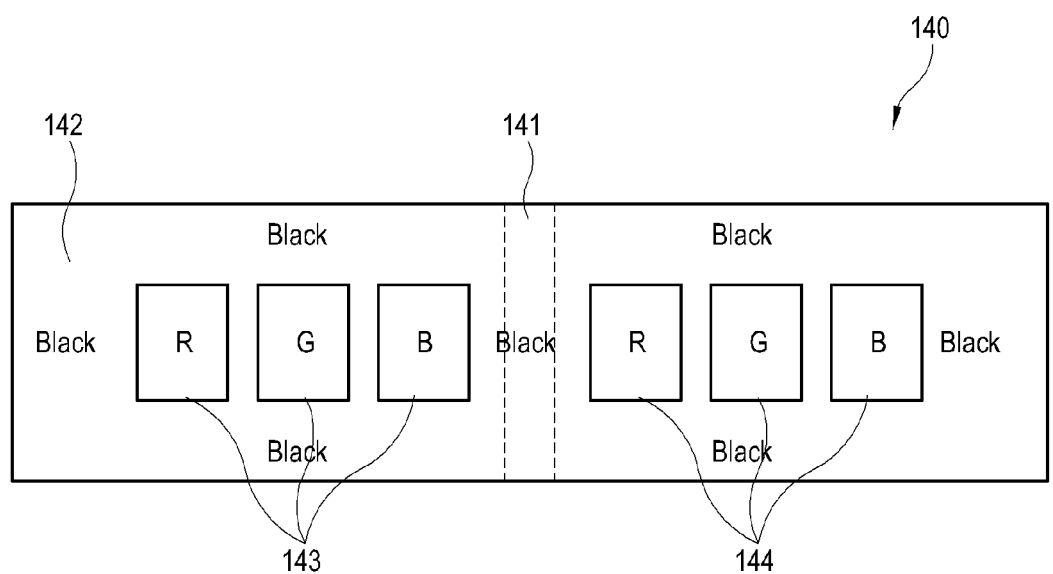
FIG. 14 is a diagram illustrating an example seam area overlapping the black matrix.

FIG. 14 illustrates that the seam area overlaps the black matrix. As illustrated in FIG. 14, a black matrix and pixel layer 140 includes a black matrix 142 and a plurality of sub-pixels 143 and 144. The sub-pixels 143 and 144 receive image grayscales respectively corresponding to red, green and blue, and the black matrix 142 provided in between the plurality of sub-pixels 143 and 144 serves to make a partition between the plurality of sub-pixels 143 and 144 and block out external light.

According to an example embodiment, the seam area 141 may be disposed beneath and overlap the black matrix 142. For example, the seam area 141 occupying a space of 1 micrometer (μm) or greater is disposed beneath the black matrix 142 made of a black organic material 142 so as not to be seen from the viewing direction of the display.

Figure 15:
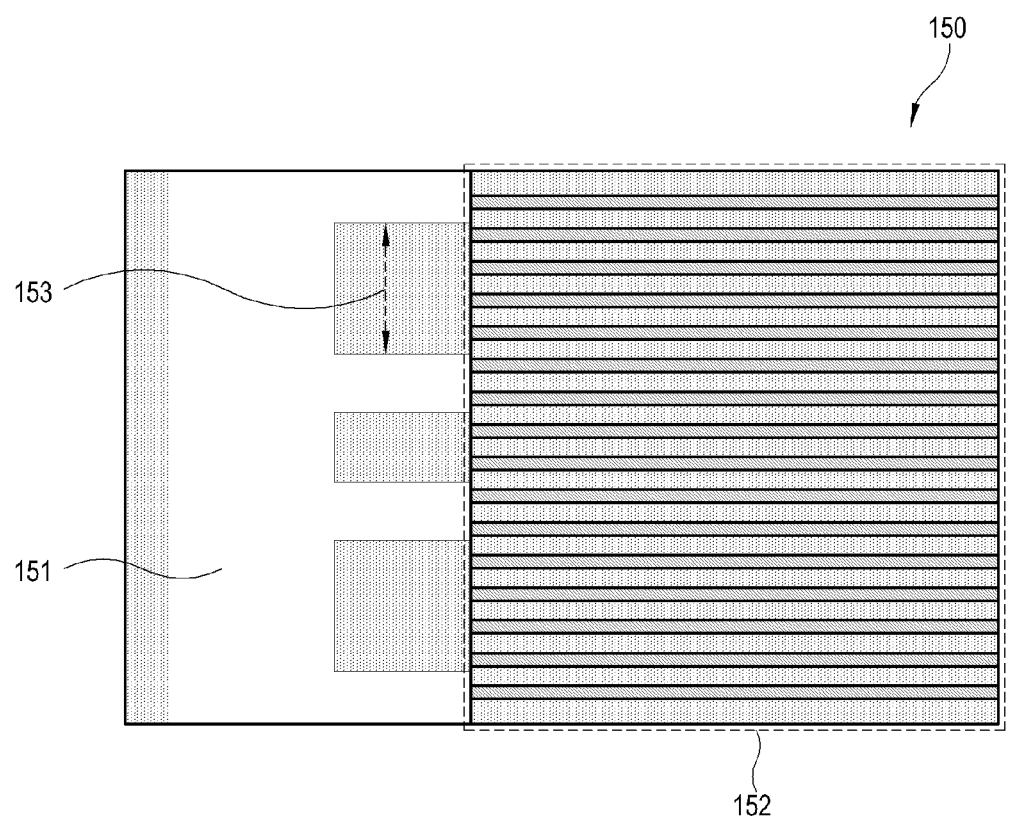
FIG. 15 is a diagram illustrating an example connection area where some grids of a grid sub-group are connected to an electrode.

FIG. 15 is a diagram illustrating an example connection area where some grids of a grid sub-group are connected to an electrode. As illustrated in FIG. 15, the polarization-touch sensing layer 150 may further include a connection area 151 corresponding to the plurality of grid sub-groups 152 and where some grids of the grid sub-group 152 connect with electrodes for outputting a touch sensing signal. The connection area 151 connects with the electrode of a touch sensing circuit provided in the display apparatus, and transmits a touch sensing signal from the touch sensing circuit to the grids of the grid sub-group 152.

The touch sensing circuit, as illustrated in FIG. 7, may include a transmitting circuit that provides a voltage pulse corresponding to a touch sensing signal to the plurality of grid sub-groups 152 corresponding to the plurality of voltage supplying lines 71, 72, . . . ; a receiving circuit that receives the voltage from the plurality of grid sub-groups corresponding to the plurality of receiving lines 73, 74, . . . ; and a digital back end (DBE) integrated circuit (IC) that determines a position of a touch input by analyzing the voltage received in the receiving circuit and controls times of the voltage pulse provided to the voltage supplying lines 71, 72, . . . ; and a central processing unit (CPU) that exchanges information about the position of the touch input, the control of the voltage pulse, etc. with the DBE IC and performs image analysis, a touch probability-related process, etc.

The other grids, which are not connected to the electrodes in the connection area 151, among the grid sub-group 152 do not transmit a touch sensing signal and therefore improve the sensitivity of a touch as compared to a case where the entire grid of the grid sub-group 152 transmits the touch sensing signal.

Within the connection area 151, the number of grids, which are not connected to the electrodes, may be determined in order to prevent the touch sensing signal from interference between the adjacent grids of the grid sub-group 152. The touch sensitivity may be lowered as the number of grids connected to the electrodes within the grid sub-group 152 increases. Therefore, the number of grids, which are not connected to the electrodes, within the grid sub-group 152 is determined in order to optimize the touch sensitivity.

According to an example embodiment, some grids of the grid sub-group 152 may be connected to the electrodes at predetermined periodic intervals 153 within the connection area 151. The interference of the touch sensing signal may decrease between the adjacent grids of the grid sub-group 152 as the interval between the grids connected to the electrodes becomes larger. The interference of the touch sensing signal may increase between the adjacent grids of the grid sub-group 152 as the interval between the grids connected to the electrodes becomes smaller. Therefore, the interval for connecting some grids with the electrodes is determined to not only optimize the touch sensitivity but also decrease the interference of the touch sensing signal between the adjacent grids. Within the connection area 151, some grids of the grid sub-group 152 may connect with the electrodes at periodic intervals of 200 μm or greater. In the connection area 151, the grids connecting with the electrodes in the grid sub-group 152 are activated, and the other grids not connecting with the electrodes are left as a dummy pattern, thereby using only some grids for sensing a touch. Since the touch sensitivity is very low when all the grids of the grid sub-group 152 formed in the polarization-touch sensing layer 150 are connected to the electrodes, only some grids are connected to the electrodes.

Figure 16:
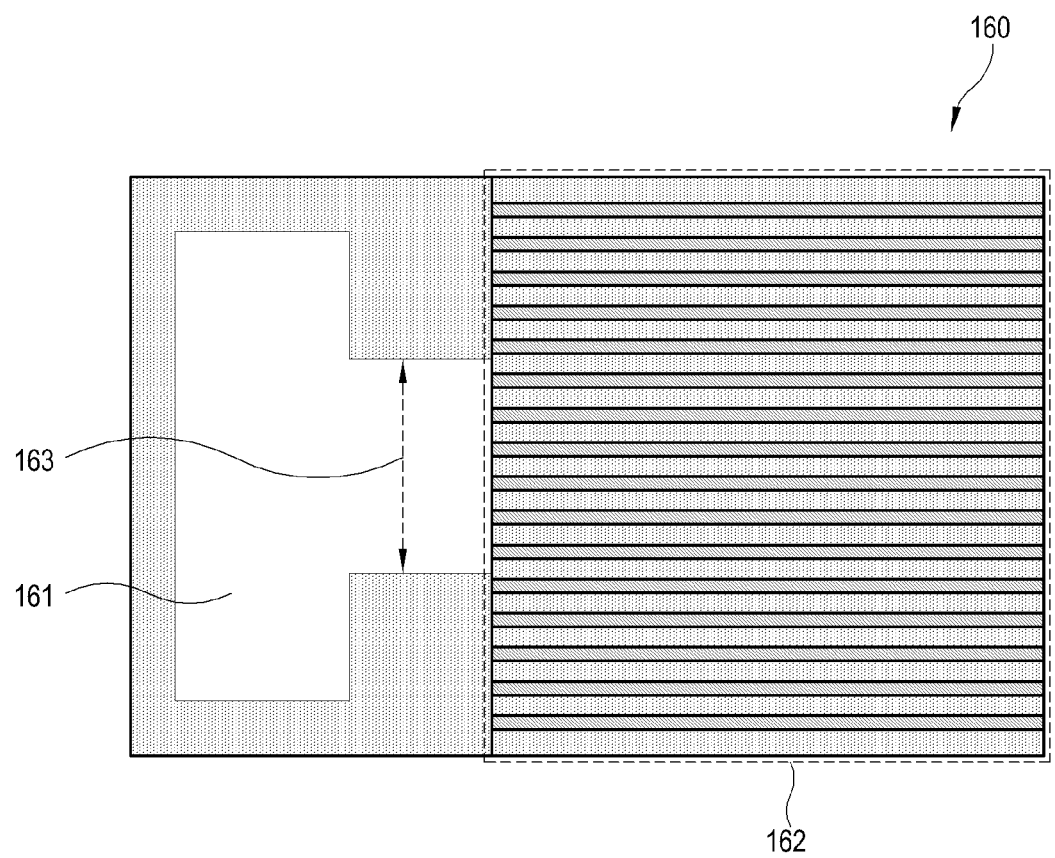
FIG. 16 is a diagram illustrating an example connection area where some grids of a grid sub-group are connected to an electrode.

FIG. 16 is a diagram illustrating an example connection area where some grids of a grid sub-group are connected to an electrode. As illustrated in FIG. 16, a polarization-touch sensing layer 160 may further include a connection area 161 corresponding to the plurality of grid sub-groups 162 and where some grids of the grid sub-group 162 connect with electrodes for outputting a touch sensing signal. The connection area 161 connects with the electrode of a touch sensing circuit provided in the display apparatus, and transmits a touch sensing signal from the touch sensing circuit to the grids of the grid sub-group 162. The connection area 161 of FIG. 16 is different in only a structural array from the connection area 151 of FIG. 15, but has the same function of connecting some grids of the grid sub-group 162 with the electrodes.

A predetermined number or more of grids may be connected to the electrodes within the connection area 161 so as to maintain sheet resistance. The interference of the touch sensing signal between the adjacent grids may increase since an interval from the grids of another adjacent grid sub-group, connected to the electrodes, becomes narrower as the number of grids in the grid sub-group 162, connected to the electrodes, increases. The interference of the touch sensing signal between the adjacent grids may decrease since an interval from the grids of another adjacent grid sub-group, connected to the electrodes, becomes wider as the number of grids in the grid sub-group 162, connected to the electrodes, decreases. Therefore, the number of grids in the grid sub-group 162, connected to the electrodes, may be determined in order to not only reduce the interference of the touch sensing signal between the adjacent grids but also optimize the touch sensitivity.

According to an example embodiment, a predetermined number of grids of the grid sub-group 162, which correspond to a predetermined interval 163, may connect with the electrodes within the connection area 161. For example, some grids corresponding to an interval of 15 (μm) may connect with the electrodes within the connection area 161. For example, the grids of the grid sub-group 162, connected to the electrodes, are activated, but the other grids, not connected to the electrodes are left as a dummy pattern within the connection area 161, so that only some grids can be employed for sensing a touch. Similarly, since the touch sensitivity is very low when all the grids of the grid sub-group 162 are connected to the electrodes, only some grids are connected to the electrodes.

Figure 17:
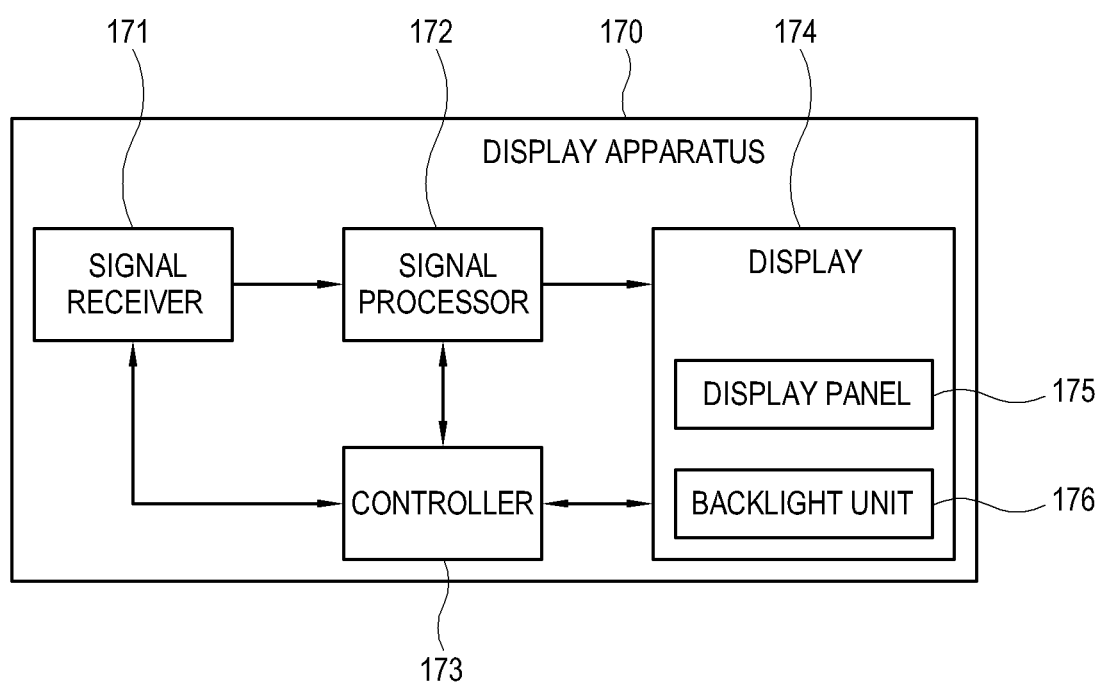
FIG. 17 is a block diagram illustrating an example display apparatus with a display panel.

FIG. 17 is a block diagram illustrating an example display apparatus with the display panel. As illustrated in FIG. 17, the display apparatus 170 includes a signal receiver (e.g., including receiving circuitry) 171, a signal processor (e.g., including processing circuitry) 172, a controller 173, and a display 174, in which the display 174 includes a display panel 175 and a backlight unit 176. The display apparatus 170 may be, for example, realized as a television, a monitor or the like home appliance; a smart phone, a portable multimedia player (PMP), a net book, a notebook computer or the like portable terminal; or a display apparatus for an electronic board and advertisement, or the like. The display apparatus 170 may further include at least one of a storage (not shown) and a communicator (not shown). The display apparatus 170 includes a display panel 175 with a polarization-touch sensing layer, and the polarization-touch sensing layer includes a plurality of wire grid areas where a grid pattern is arranged to polarize incident light from the backlight unit and transmit a plurality of touch sensing signals for sensing a user's touch. Further, the polarization-touch sensing layer includes a plurality of seam areas which are provided in between the plurality of wire grid areas, and has a conductive area configured to transmit or communicate the touch sensing signal between the pair of adjacent grid patterns among the plurality of grid patterns, and a nonconductive area configured to prevent the plurality of touch sensing signals from being transmitted or communicated between the pair of grid patterns.

According to an example embodiment, the display panel 175 of the display apparatus 170 includes a conductive area carrying the touch sensing signal between the pair of adjacent grid patterns among the plurality of grid patterns, and a nonconductive area preventing the plurality of touch sensing signals from being transmitted between the pair of grid patterns, within the seam area provided in between the plurality of wire grid areas where the grid patterns are respectively arranged, thereby achieving the touch screen using the large-sized wire grid polarizer. The display panel 175 of the display apparatus 170 according to an example embodiment has an advantage that the seam area between the plurality of wire grid areas is not seen since the seam area is arranged to overlap with the black matrix.

The signal receiver 171 receives an image signal. According to an example embodiment, the signal receiver 171 may receive a broadcast signal of a selected channel. The signal receiver 171 may be variously realized in accordance with formats of a broadcast signal to be received and types of the display apparatus 170. For example, the signal receiver 171 may be achieved by a tuner for receiving a radio frequency (RF) broadcast signal from a broadcasting station or receiving a satellite signal, or the like.

The signal processor 172 may be configured to process received signals with regard to an image signal or broadcast signal received in the signal receiver 171. There are no limits to the kinds of signal processing processes performed in the signal processor 172, and the signal processing processes may include a process for decoding data of a broadcast signal.

The display 174 includes the display panel 175 and the backlight unit 176. The display panel 175 displays an image based on the image signal processed by the signal processor 172. The controller 173 is configured to control the display apparatus so that the display panel 175 displays an image.

The backlight unit 176 is arranged behind the display panel 175, so that light emitted from the backlight unit 176 can enter a lower surface of the display panel 175 and exit an upper surface of the display panel 175. According to an example embodiment, the backlight unit 176 may include a light source (not shown) arranged at an edge region of the display panel 175, a light guide plate (not shown) arranged in parallel with the display panel 175 and facing the lower surface of the display panel 175, a reflection plate (not shown) arranged behind the light guide plate and facing a lower surface of the light guide plate, and one or more optical sheets (not shown) interposed in between the display panel 175 and the light guide plate.

According to an example embodiment, the display panel 175 includes the liquid crystal layer and the polarization-touch sensing layer. As illustrated, for example, in FIG. 10, the polarization-touch sensing layer 100 polarizes the incident light from the backlight unit 176, and includes the first wire grid area 101 and the second wire grid area 102 where the first grid pattern 103 and the second grid pattern 104 are respectively arranged to transmit or communicate the plurality of touch sensing signals for sensing a user's touch. Further, the polarization-touch sensing layer 100 includes the plurality of seam areas 106 that is provided in between the first wire grid area 101 and the second wire grid area 102 and has the conductive area 107 for transmitting or communicating the touch sensing signal between the first grid pattern 103 and the second grid pattern 104, and the nonconductive area 108 for preventing the plurality of touch sensing signals from being transmitted between the first grid pattern 103 and the second grid pattern 104.

The first grid pattern 103 and the second grid pattern 104 include the plurality of grid sub-groups 105 for transmitting or communicating the plurality of touch sensing signals, respectively. The conductive area 107 is provided corresponding to the plurality of grid sub-groups 105, and made of the same conductive material as the first grid pattern 103 and the second grid pattern 104.

The first grid pattern 103 and the second grid pattern 104 may be formed on the first wire grid area 101 and the second wire grid area 102 by etching the metal layer of the polarization-touch sensing layer 100 except the conductive area 107.

The nonconductive area 108 may be formed in the seam area 106 by etching the metal layer of the polarization-touch sensing layer 100 other than the conductive area 107. The nonconductive area 108 may have a predetermined width to prevent electrification between the first grid pattern 103 and the second grid pattern 104. The first grid pattern 103 and the second grid pattern 104 may be separated from each other with the nonconductive area 108 therebetween. For example, the nonconductive area 108 may be etched in the form of a square grid having a predetermined size in the seam area 106, and prevents an electric current from flowing between the first grid pattern 103 and the second grid pattern 104 which are adjacent to each other. The nonconductive area 108 is not limited to the size and etched pattern according to an example embodiment, but may be formed to have various sizes and patterns.

According to an example embodiment, as illustrated in FIG. 13, the black matrix 1391 may be further provided to overlap at least a part of the seam area 138 so that the seam area 138 cannot be seen from the viewing direction of the display panel 130. The seam area 138 should not be seen since a seam between the plurality of grid patterns formed in the polarization-touch sensing layer 133 and the second polarization-touch sensing layer 135 of the display panel 130 may cause a defect of the display panel 130. Therefore, the seam area 138 is arranged to overlap the black matrix 1391 for blocking out the external light, so that the seam area 138 cannot be seen from the viewing direction.

According to an example embodiment, as illustrated in FIG. 15, the number of grids in the grid sub-group 152 not connecting with the connection area 151 may be determined in order to prevent interference of the touch sensing signal between the adjacent grids. According to an example embodiment, some grids of the grid sub-group 152 may be connected to the electrodes at predetermined periodic intervals 153 within the connection area 151. In the connection area 151, the grids connecting with the electrodes in the grid sub-group 152 are activated, and the other grids not connecting with the electrodes are left as a dummy pattern, thereby using only some grids for sensing a touch.

As illustrated in FIG. 16, a predetermined number or more of grids in the grid sub-group 162 may be connected to the electrodes within the connection area 161.

According to an example embodiment, some grids of the grid sub-group 162, which correspond to a predetermined interval 163, may be connected to the electrodes. For example, in the connection area 161, the grids connecting with the electrodes in the grid sub-group 162 are activated, and the other grids not connecting with the electrodes are left as a dummy pattern, thereby using only some grids for sensing a touch.

According to an example embodiment, the display panel 175 may further include the second polarization-touch sensing layer 14 arranged opposite the polarization-touch sensing layer 12 as illustrated in FIG. 1. The second grid pattern 16 of the second polarization-touch sensing layer 14 may be arranged perpendicularly intersecting the grid pattern 17 of the polarization-touch sensing layer 12. For example, in order to achieve the touch screen using the polarization-touch sensing layer 12 and the second polarization-touch sensing layer 14, the second grid pattern 16 of the second polarization-touch sensing layer 14 may be used as a line for transmitting the touch sensing signal, and the grid pattern 17 of the polarization-touch sensing layer 12 may be used as a line for receiving the touch sensing signal.

As described above, in the display panel according to an example embodiment, the conductive area for carrying the touch sensing signal between the pair of adjacent grid patterns, and the nonconductive area for preventing the plurality of touch sensing signals from being transmitted between the pair of grid pattern are provided in the seam area provided in between the plurality of wire grid areas where the grid patterns are respectively arranged, thereby achieving the touch screen using the large-sized wire grid polarizer.

Further, according to an example embodiment, the seam area between the plurality of wire grid areas is arranged to overlap the black matrix in order to prevent the seam area from being seen.

Although a few example embodiments have been illustrated and described, it will be appreciated by those skilled in the art that changes may be made in these example embodiments without departing from the principles and spirit of the disclosure, the scope of which is defined in the appended claims and their equivalents.

What is claimed is:

1. A display panel comprising:
    a liquid crystal layer; and
    a polarization-touch sensing layer stacked on one side of the liquid crystal layer,
    the polarization-touch sensing layer comprising:
    a plurality of wire grid areas configured to polarize incident light from a light source, the plurality of wire grid areas including grid patterns configured to transmit a plurality of touch sensing signals; and
    a plurality of seam areas arranged in between the plurality of wire grid areas, the seam areas comprising a conductive area configured to transmit the touch sensing signals between a pair of adjacent grid patterns, and a nonconductive area configured to block touch sensing signals from being transmitted between the pair of adjacent grid patterns.

2. The display panel according to claim 1, wherein each of the plurality of grid patterns comprises a plurality of grid sub-groups configured to transmit the plurality of touch sensing signals.

3. The display panel according to claim 2, wherein the conductive area of the seam areas is arranged to correspond to each of the plurality of grid sub-groups and comprises the same material as the plurality of grid patterns, and
    wherein the nonconductive area has a predetermined size configured to prevent the touch sensing signal from being transmitted between the pair of adjacent grid patterns having the nonconductive area disposed therebetween.

4. The display panel according to claim 3, wherein the plurality of grid patterns is formed on the plurality of wire grid areas by etching a metal layer of the polarization-touch sensing layer other than the conductive area.

5. The display panel according to claim 2, wherein the polarization-touch sensing layer further comprises a connection area corresponding to each of the plurality of grid sub-groups, wherein some grids of the grid sub-groups are connected to electrodes for outputting the touch sensing signal.

6. The display panel according to claim 5, wherein, in the connection area, the number of grids that are not connected to the electrodes, is determined based on reducing interference of the touch sensing signal between adjacent grids of the grid sub-group.

7. The display panel according to claim 1, wherein the plurality of grid patterns are separated from each other with the nonconductive area being disposed therebetween, and
    wherein the nonconductive area is formed on the plurality of seam areas by etching a metal layer of the polarization-touch sensing layer other than the conductive area.

8. The display panel according to claim 1, further comprising a black matrix arranged to overlap at least a part of the seam area.

9. The display panel according to claim 1, further comprising a second polarization-touch sensing layer arranged opposite the polarization-touch sensing layer, and having the liquid crystal layer disposed between the polarization-touch sensing layer and the second polarization-touch sensing layer,
    the second polarization-touch sensing layer comprising:
    a plurality of second wire grid areas configured to polarize incident light from a light source, the second wire grid areas including grid patterns configured to transmit a plurality of touch sensing signals; and
    a plurality of second seam areas arranged in between the plurality of second wire grid areas, the second seam areas comprising a conductive area configured to transmit the touch sensing signal between a pair of adjacent second grid patterns, and a nonconductive area configured to block the plurality of touch sensing signals from being transmitted between the pair of second grid patterns.

10. The display panel according to claim 9, wherein the second grid pattern of the second polarization-touch sensing layer is arranged orthogonally to the grid pattern of the polarization-touch sensing layer.

11. A display apparatus comprising:
signal receiving circuitry configured to receive an image signal;
a signal processor configured to process the received image signal;
a display panel configured to display an image based on the processed image signal; and
a controller configured to control the display apparatus to display the image,
the display panel comprising:
a liquid crystal layer; and
a polarization-touch sensing layer stacked on one side of the liquid crystal layer,
the polarization-touch sensing layer comprising:
a plurality of wire grid areas configured to polarize incident light from a light source, the wire grid areas including grid patterns configured to transmit a plurality of touch sensing signals; and
a plurality of seam areas arranged in between the plurality of wire grid areas, the seam areas comprising a conductive area configured to transmit the touch sensing signal between a pair of adjacent grid patterns, and a nonconductive area configured to block the plurality of touch sensing signals from being transmitted between the pair of grid patterns.

12. The display apparatus according to claim 11, wherein each of the plurality of grid patterns comprises a plurality of grid sub-groups configured to transmit the plurality of touch sensing signals.

13. The display apparatus according to claim 12, wherein the conductive area of the seam areas is arranged to correspond to each of the plurality of grid sub-groups and comprises the same material as the plurality of grid patterns, and
wherein the nonconductive area has a predetermined size configured to block the touch sensing signal from being transmitted between the pair of adjacent grid patterns having the nonconductive area disposed therebetween.

14. The display apparatus according to claim 13, wherein the plurality of grid patterns is formed on the plurality of wire grid areas by etching a metal layer of the polarization-touch sensing layer other than the conductive area.

15. The display apparatus according to claim 12, wherein the polarization-touch sensing layer further comprises a connection area corresponding to each of the plurality of grid sub-groups, wherein some grids of the grid sub-groups are connected to electrodes for outputting the touch sensing signal.

16. The display apparatus according to claim 15, wherein in the connection area, the number of grids that are not connected to the electrodes, is determined based on reducing interference of the touch sensing signal between adjacent grids of the grid sub-group.

17. The display apparatus according to claim 11, wherein the plurality of grid patterns are separated from each other with the nonconductive area being disposed therebetween, and
wherein the nonconductive area is formed on the plurality of seam areas by etching a metal layer of the polarization-touch sensing layer other than the conductive area.

18. The display apparatus according to claim 11, further comprising a black matrix arranged to overlap at least a part of the seam area.

19. The display apparatus according to claim 11, further comprising a second polarization-touch sensing layer arranged opposite the polarization-touch sensing layer,
the second polarization-touch sensing layer comprising:
a plurality of second wire grid areas configured to polarize incident light from a light source, the second wire grid areas including grid patterns configured to transmit a plurality of touch sensing signals; and
a plurality of second seam areas arranged in between the plurality of second wire grid areas, the second seam areas comprising a conductive area configured to transmit the touch sensing signal between a pair of adjacent second grid patterns, and a nonconductive area configured to block the plurality of touch sensing signals from being transmitted between the pair of second grid patterns.

20. The display apparatus according to claim 19, wherein the second grid pattern of the second polarization-touch sensing layer is arranged orthogonally to the grid pattern of the polarization-touch sensing layer.

* * * * *